US007886091B2

(12) United States Patent
de Kerf

(10) Patent No.: US 7,886,091 B2
(45) Date of Patent: Feb. 8, 2011

(54) METHODS AND ARRANGEMENTS FOR PERFORMING DESKTOP SWITCHING

(75) Inventor: Anthony A. de Kerf, Menlo Park, CA (US)

(73) Assignee: Global Serv Inc., Menlo Park, CA (US)

( * ) Notice: Subject to any disclaimer, the term of this patent is extended or adjusted under 35 U.S.C. 154(b) by 391 days.

(21) Appl. No.: 11/198,513

(22) Filed: Aug. 5, 2005

(65) Prior Publication Data
US 2007/0033529 A1    Feb. 8, 2007

(51) Int. Cl.
G06F 13/12    (2006.01)
(52) U.S. Cl. .......................... 710/62; 709/223
(58) Field of Classification Search .................. 710/62
See application file for complete search history.

(56) References Cited

U.S. PATENT DOCUMENTS

| | | | |
|---|---|---|---|
| 5,315,633 A | 5/1994 | Champa | |
| 5,369,566 A | 11/1994 | Pfost et al. | |
| 5,721,842 A | 2/1998 | Beasley et al. | |
| 5,732,212 A | 3/1998 | Perholtz et al. | |
| 5,884,096 A * | 3/1999 | Beasley et al. | 710/38 |
| 5,937,176 A | 8/1999 | Beasley et al. | |
| 6,304,895 B1 | 10/2001 | Schneider et al. | |
| 6,324,588 B1 | 11/2001 | Desruisseaux et al. | |
| 6,359,636 B1 | 3/2002 | Schindler et al. | |
| 6,378,014 B1 | 4/2002 | Shirley | |
| 6,388,658 B1 | 5/2002 | Ahern et al. | |
| 6,552,738 B1 | 4/2003 | Lin et al. | |
| 6,557,170 B1 | 4/2003 | Wilder et al. | |
| 6,567,869 B2 | 5/2003 | Shirley | |
| 6,671,756 B1 | 12/2003 | Thomas et al. | |
| 6,681,250 B1 | 1/2004 | Thomas et al. | |
| 7,114,018 B1 | 9/2006 | Maity et al. | |
| 2001/0039576 A1 | 11/2001 | Kanada | |
| 2003/0051021 A1 * | 3/2003 | Hirschfeld et al. | 709/223 |
| 2003/0164816 A1 | 9/2003 | Paetz et al. | |
| 2003/0218578 A1 | 11/2003 | Ahern et al. | |
| 2005/0165994 A1 * | 7/2005 | Dickens | 710/305 |
| 2006/0285514 A1 * | 12/2006 | Hoerl et al. | 370/328 |
| 2007/0088840 A1 | 4/2007 | de Kerf | |
| 2007/0088841 A1 | 4/2007 | de Kerf | |

(Continued)

OTHER PUBLICATIONS

Belkin Corporation, "2-Port KVM Switch with Built-In Cabling" User Manual, FIDK102U, 18 Pages.*

(Continued)

*Primary Examiner*—Eron J Sorrell
(74) *Attorney, Agent, or Firm*—IP Strategy Group, P.C.

(57) ABSTRACT

A method for creating a complete data path between a user interface device (UID) and a second system device. The UID is coupled to a first system device via a UID switch prior to creating the UID, the first system device, and the second device being coupled to the UID switch. The method includes receiving from the UID at the first system device a connect request. The connect request represents a request to form the complete data path between the UID and the second system device via the UID switch. The method also includes formulating a switch command that is configured to cause the UID switch to create the complete data path when the switch command is executed by the UID switch. The method further includes transmitting the switch command from the first system device to the UID switch.

26 Claims, 20 Drawing Sheets

U.S. PATENT DOCUMENTS

2007/0282997 A1* 12/2007 Trochman .................. 709/224
2009/0077280 A1* 3/2009 Anderson et al. ............. 710/62

OTHER PUBLICATIONS

International Search Report (PCT) mailed May 24, 2007 re PCT/US2006/030388.
Written Opinion of the ISA mailed May 24, 2007 re PCT/US2006/030388.
Network Technologies Inc., "KEEMUX-Px PS/2 KVM Switch Installation and Operation Manual," Jun. 25, 2004; pp. 1-29.
Rose Electronics., "Single user KVM Switch with Dual or Quad Video" (2004), pp. 1-2.
Cybex Computer Products Corporation., "XP 4000 Series Installer/User Guide," pp. 1-157.
U.S. Appl. No. 11/198,030, filed Aug. 5, 2005; Inventors: Anthony A. De Kerf.
U.S. Appl. No. 11/322,989, filed Dec. 30, 2005; Inventors: Anthony A. De Kerf.
"Final Office Action", U.S. Appl. No. 11/198,030; Correspondence Date: Jan. 23, 2008, pp. 32.
"Final Office Action", U.S. Appl. No. 11/322,989; Correspondence Date Nov. 28, 2007, pp. 17.
"Non-Final Office Action", U.S. Appl. No. 11/322,989; Correspondence Date Apr. 4, 2008, pp. 18.
"Belkin Corporation", "2-Port KVM Switch with Built-In Cabling" User Manual, F1DK102P, Published in 2003, Total Pages: 21.
"International Preliminary Report on Patentability", Issued in PCT Application No. PCT/US2006/030387; Mailing Date: Feb. 14, 2008.
Tron International, Inc., "Select your Keyboard/Video Switch ports with KVSelect", Network World ad, 1 page, (Sep. 19, 1996).
"Final Office Action", U.S. Appl. No. 11/322,989, Mailing Date: Jan. 15, 2009.

* cited by examiner

METHODS AND ARRANGEMENTS FOR PERFORMING DESKTOP SWITCHING

BACKGROUND OF THE INVENTION

Progress in technology combined with lowering cost have proliferated the usage of multiple system devices by a single user. Modern society's want for increased efficiency has resulted in the development of a keyboard, video monitor, and mouse (KVM) switch that enables the user to control a plurality of system devices (e.g., computers, servers, power supply units, etc.) from a singular location.

In an example, a user has two computers, which the user wants to control through a single console (i.e., a keyboard, video monitor, and/or mouse). The user is able to operate either computer by connecting the console and the two computers to the KVM switch.

To illustrate the data flow within the aforementioned example, FIG. 1A shows a simple KVM switch configuration. The switch configuration may be divided into two sections, a front end 101 and a back end 103. Front end 101 may include a video monitor 105, a keyboard 107, a mouse 109, and cable cords connecting the aforementioned input devices to a KVM switch 111. Back end 103 may include a server 113 which may be connected to KVM switch 111 via a keyboard cable 117, a mouse cable 119, and a video cable 121. Additionally, a server 115 may be connected to KVM switch 111 by a keyboard cable 123, a mouse cable 125, and a video cable 127. Thus, by using one set of peripherals (105, 107, and 109), the user may now alternate between servers (113, 115) as data flow may be sent to either one of the servers (113, 115).

Generally, when a user requests for a connection with a server, data may flow from front end 101 to KVM switch 111. KVM switch 111 may then relay the request to a server located in back end 103. Although the keyboard, video monitor and mouse utilized are capable of bi-directional communication, i.e., the ability to both send and receive information, oftentimes, the data flow is uni-directional (i.e., sending data) from the front end to the back end.

Similarly, KVM switches may be employed in an enterprise environment. Consider the situation wherein, for example, a company with several departments. Each department may have servers from which one or more users may need access. To enable these servers to be shared among a plurality of users, KVM switches may be implemented. To facilitate discussion, FIG. 1B shows a company with three departments (100, 102, and 104). Each department may have a plurality of users (100a, 102a, and 104a, respectively) who may need access to a plurality of servers (100b, 102b, and 104b, respectively). By employing KVM switches (100c, 102c, and 104c, respectively), a user may be able to access each server from his console.

The aforementioned example (i.e., FIG. 1B) is a simple enterprise example; however, KVM switches are typically used in a data center environment wherein thousands of servers may be interconnected. To connect the servers, a plurality of KVM switches may have to be daisy-chained together to form a network. Generally, a KVM switch may support 2 to 64 input ports; thus, the number of KVM switches may depend upon the number of ports supported by a KVM switch.

KVM switches may be managed by three main methods: pressing a button on the KVM switch, using keyboard commands, and assessing on-screen displays (OSDs). In the first method, a user has to manually press a button on the KVM switch to access a server. Although this method may be feasible in simple server or desktop environments, this method is highly inefficient in a larger enterprise environment, such as a data center, where servers may occupy a building the size of a football stadium.

In the second method, keyboard commands (e.g., pressing function keys, an escape key, an enter key, etc.) may be utilized to control KVM switches. The user may enter separate keyboard commands to initialize a KVM switch and to connect to a server. To establish a data path connectivity to the target server, the user may have the repetitive task of continually entering keyboard commands in order to move from one KVM switch/server to another. As discussed herein, data path connectivity refers to the process of establishing a connection from a console to a server through one or more KVM switches. The user may find this method tedious if a large number of KVM switches are interposed between the user's console and the server. The repetitive task of manually entering the keyboard commands may be time-consuming and prone to human errors.

In the third method, KVM switches may be accessible through an on-screen display (OSD), which is a DOS-like screen listing the servers connected to the KVM switch. The user may enter separate keyboard commands to initialize the KVM switch and to activate the OSD. Since the OSD may limit the server names displayed, a user may either have to page-down or type in a server name to select and connect to the server. If multiple KVM switches are interposed between the user's console and the target server, the user may have the onerous task of repeating this process until the user is connected to the target server. Similar to the second method, this task may be time-consuming and prone to human errors.

If a user operates within a homogeneous switch environment, the disadvantages in the aforementioned methods of managing KVM switches may be alleviated wherein the task of establishing the data path connectivity to the target server is simplified. As discussed herein, a homogeneous switch environment refers to an environment in which KVM switches employed by a company are of the same brand, make, and model (e.g., Avocent AV200 KVM Switch). Since the KVM switches share the same command protocol structures, the operating systems of the KVM switches are able to communicate with one another to establish a data path connectivity through any available KVM switch.

FIG. 2 shows an example of a homogeneous KVM switch environment. Five groups of servers (202a, 202b, 202c, 202d, and 202e) are connected to a group of consoles (210a, 210b, 210c, 210d, 210e, and 210f) via a plurality of KVM switches (204a, 204b, 204c, 204d, 204e, 206a, 206b, 206c, 208a and 208b).

In an example, the user may enter keyboard commands to initialize KVM switch 208b and to select group of servers (GOS) 202d. By executing the keyboard commands, KVM switch 208b sends the request to the target server or to the next available KVM switch. Since KVM switch 208b is not directly connected to GOS 202d, the signal is forwarded to KVM switch 206a, 206b or 206c. Upon receiving the signal, KVM switch 206c forwards the signal to KVM switch 204d since GOS 202d is not directly connected to KVM switch 206c. As KVM switch 204d is directly connected to GOS 202d, a connection is made between console 210f and GOS 202d.

However, a heterogeneous switch environment may be more prevalent in today's acquisition and merger enterprise environment. As discussed herein, a heterogeneous switch environment refers to an environment in which one or more KVM switches employed by a company are of different brands, makes, and/or models. Note that heterogeneous switch environment may include homogeneous switches. As distinct command protocols (i.e., communication syntaxes which KVM switches use to send switch command signals from a console) may exist for heterogeneous KVM switches, the operating systems of the KVM switches may be incommunicable with one another in order to establish data path connectivity by executing a single command.

FIG. 3A shows a heterogeneous KVM switch environment. A KVM switch 302 is connected to KVM switches 304 and 306; connected to KVM switch 302, via KVM switch 304, are KVM switches 308 and 310. A group of servers (GOS) 312 and consoles 314a, 314b, and 314c are connected to KVM switch 302. Connected to KVM switch 304 are a console 316 and a GOS 318. Also connected to KVM switch 306 is a GOS 320. Attached to KVM switches 308 and 310 are a GOS 322 and a GOS 324, respectively.

FIG. 3B represents a flowchart outlining the steps establishing data path connectivity in a heterogeneous switch environment. FIG. 3B will be discussed relative to FIG. 3A. Consider the situation wherein, for example, a user at console 314c wants to connect to GOS 322. Unless the user knows the data path to establish connectivity, the user may have to employ a trial-and-error method (i.e., randomly selecting a server) at each KVM switch in order to determine the appropriate data path. Since the data path establishing connectivity between the two include three heterogeneous KVM switches (302, 304, and 308), the operating systems of the KVM switches may be incommunicable forcing the user to remember, repeat, and use multiple command structures at each KVM switch (302, 304, and 308).

Keyboard based switch commands (i.e., a first set of command protocols) may be entered by the user at console 314c to initialize KVM switch 302, which is not directly connected to GOS 322 (steps 352 and 354). The OSD appears with a list of available server ports that are connected to KVM switch 302 (step 356), wherein the user may either page-down through the list or type in the server name (step 358). In order to determine the next KVM switch along the data path, the user may select/highlight a server port (step 360) by employing a trial-and-error method. Once a server port has been selected, the user may press the enter key (step 362) which may shut down the OSD (step 364) and may execute the switch command protocol enabling the user access to the new server or groups of server ports (step 366) at the next KVM switch using the next switch command protocol.

However, if the new server is not located within the same GOS or along the same data path as KVM switches 302, 304, and 308 (step 368), the user may have to return to the previous KVM switch (e.g. KVM switch 302) to repeat the process until successfully connecting to the next target server (i.e., GOS 318) is established (step 370). From GOS 318, the user may employ a second set of command protocols to connect to the next KVM switch (i.e., KVM switch 308). Steps 352 to 366 are repeated at KVM switches 304 and 308 until the user reaches the group of server ports at which the target server (GOS 322) resides. In the above example, three different command protocols are employed before the user is connected to GOS 322 (step 370).

There are several disadvantages associated with a heterogeneous KVM switch environment. For example, since the operating systems of heterogeneous KVM switches are incommunicable with one another, the user may have to spend more time to establish data path connectivity. Further, while establishing the data path connectivity between the KVM switches, the user may be required to authenticate (e.g., user name, password, etc.) at each KVM switch. For some users, this process may become repetitive and tedious, especially in a larger enterprise environment.

Another disadvantage exists when a user requests unauthorized access to certain servers on a KVM switch. Since not all KVM switch employs an authentication module, the user may be able to connect to all unprotected servers on the KVM switch.

SUMMARY OF INVENTION

These and other features of the present invention will be described in more detail below in the detailed description of the invention and in conjunction with the following figures.

The invention relates, in an embodiment, to a method for creating a complete data path between a user interface device (UID) and a second system device. The UID is coupled to a first system device via a UID switch prior to creating the UID, the first system device, and the second device being coupled to the UID switch. The method includes receiving from the UID at the first system device a connect request. The connect request represents a request to form the complete data path between the UID and the second system device via the UID switch. The method also includes formulating a switch command that is configured to cause the UID switch to create the complete data path when the switch command is executed by the UID switch. The method further includes transmitting the switch command from the first system device to the UID switch.

In another embodiment, the invention relates to a method for creating a complete data path between a user interface device (UID) and a second system device. The UID is coupled to a first system device via a UID switch prior to creating the UID, the first system device, and the second device being coupled to the UID switch. The method includes displaying on a display monitor associated with the UID a selectable icon. The method also includes generating at the first system device a connect request from the UID. The connect request is generated when a human user selects the selectable icon on the display monitor. The method further includes formulating, using the first system device and responsive to a receipt of the connect request, a switch command that is configured to cause the UID switch to create the complete data path when the switch command is executed by the UID switch. The method additionally includes transmitting the switch command from the first system device to the UID switch. The method yet further includes executing the switch command using the UID switch, thereby forming the complete data path between the UID and the second system device.

In yet another embodiment, the invention relates to an article of manufacture comprising a program storage medium having computer readable code embodied therein. The computer readable code is configured to create a complete data path between a user interface device (UID) and a second system device. The UID is coupled to a first system device via a UID switch prior to creating the UID, the first system device, and the second device being coupled to the UID switch. The article includes a computer readable code for receiving from the UID at the first system device a connect request. The connect request represents a request to form the complete data path between the UID and the second system device via the UID switch. The article also includes a computer readable code for formulating a switch command that is configured to cause the UID switch to create the complete data path when the switch command is executed by the UID switch. The article further includes a computer readable code for transmitting the switch command from the first system device to the UID switch.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1A:
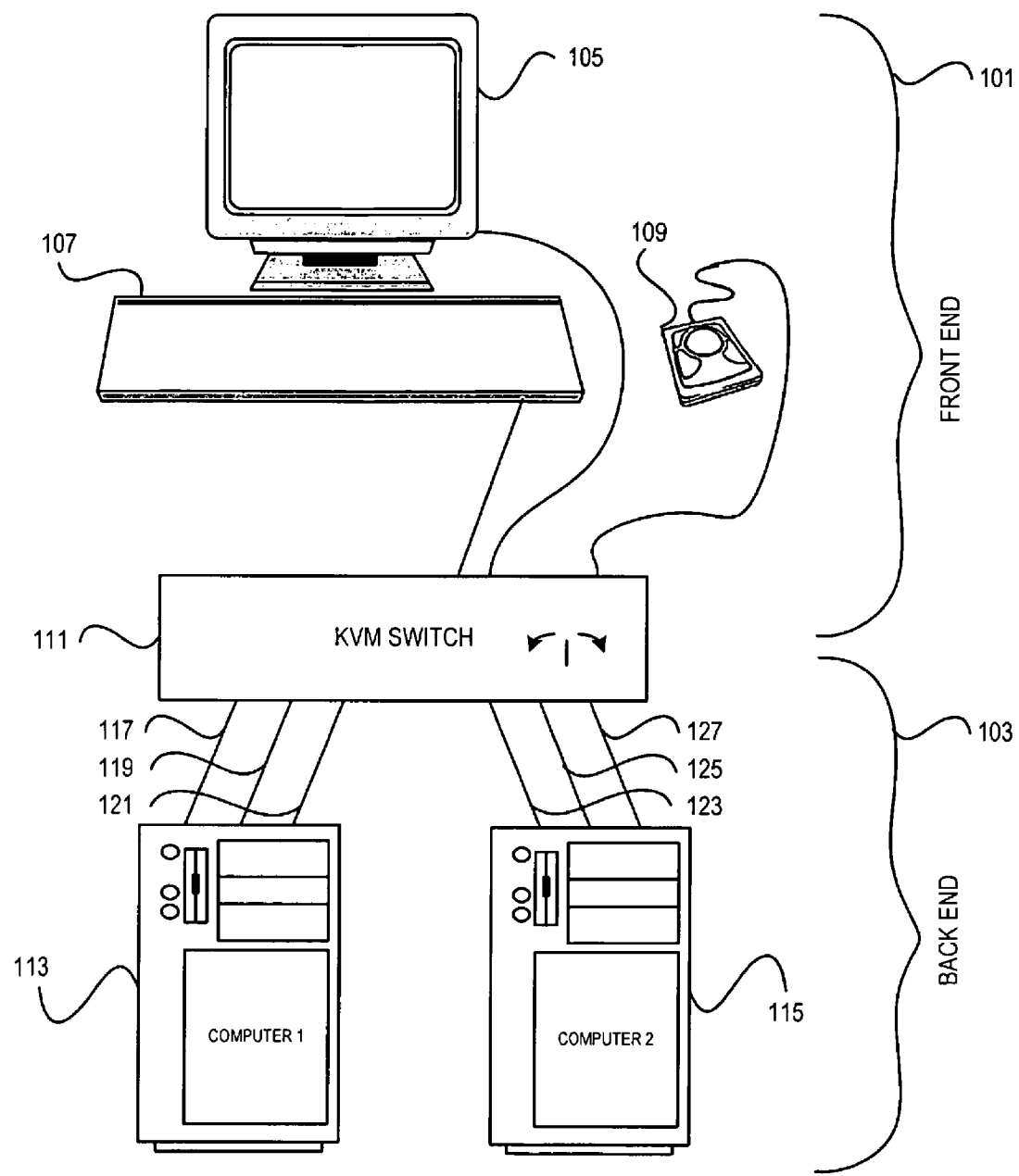
FIG. 1A shows an example of a simple KVM switch environment.
Figure 1B:
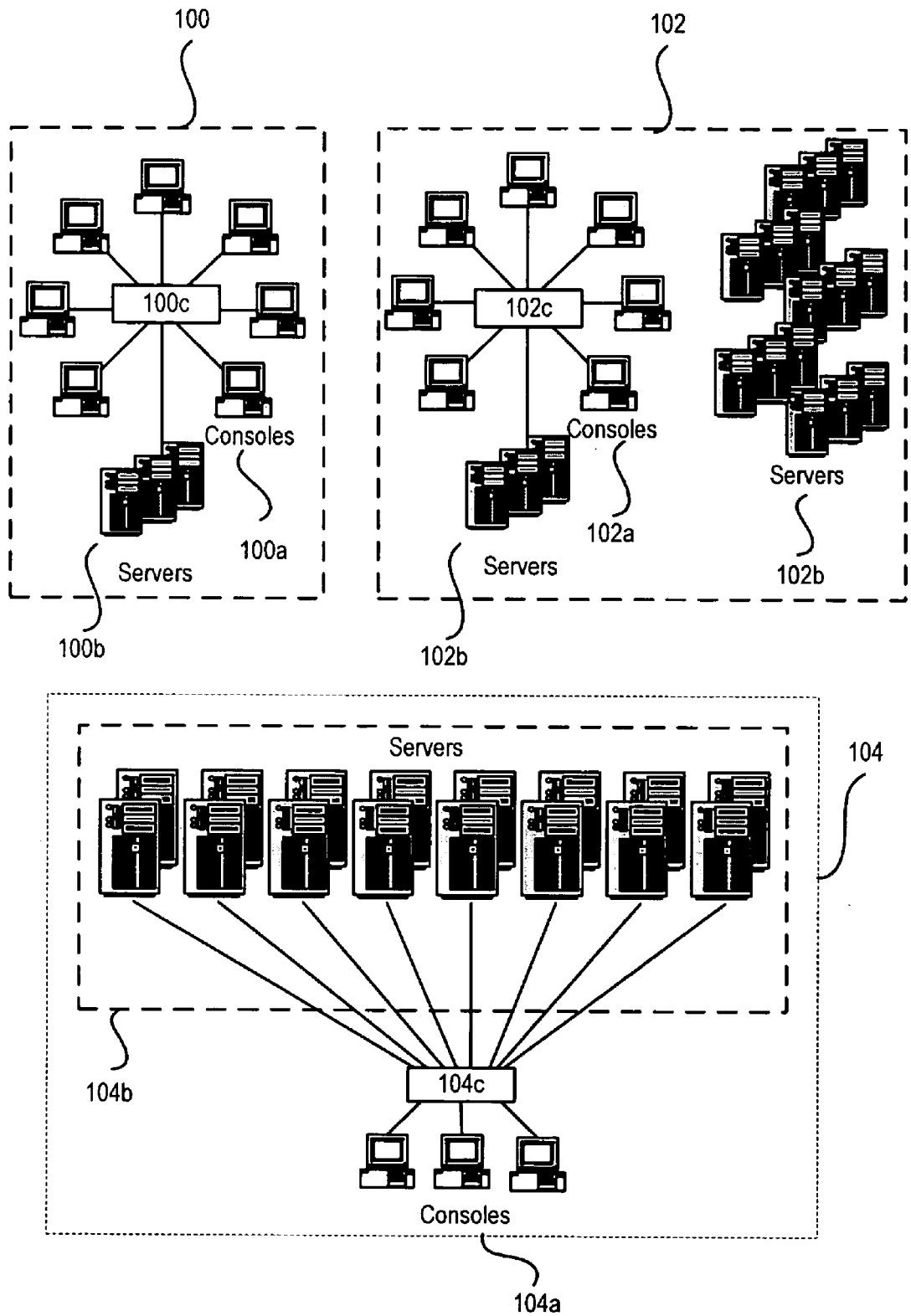
FIG. 1B shows an example of a simple enterprise switch environment.
Figure 2:
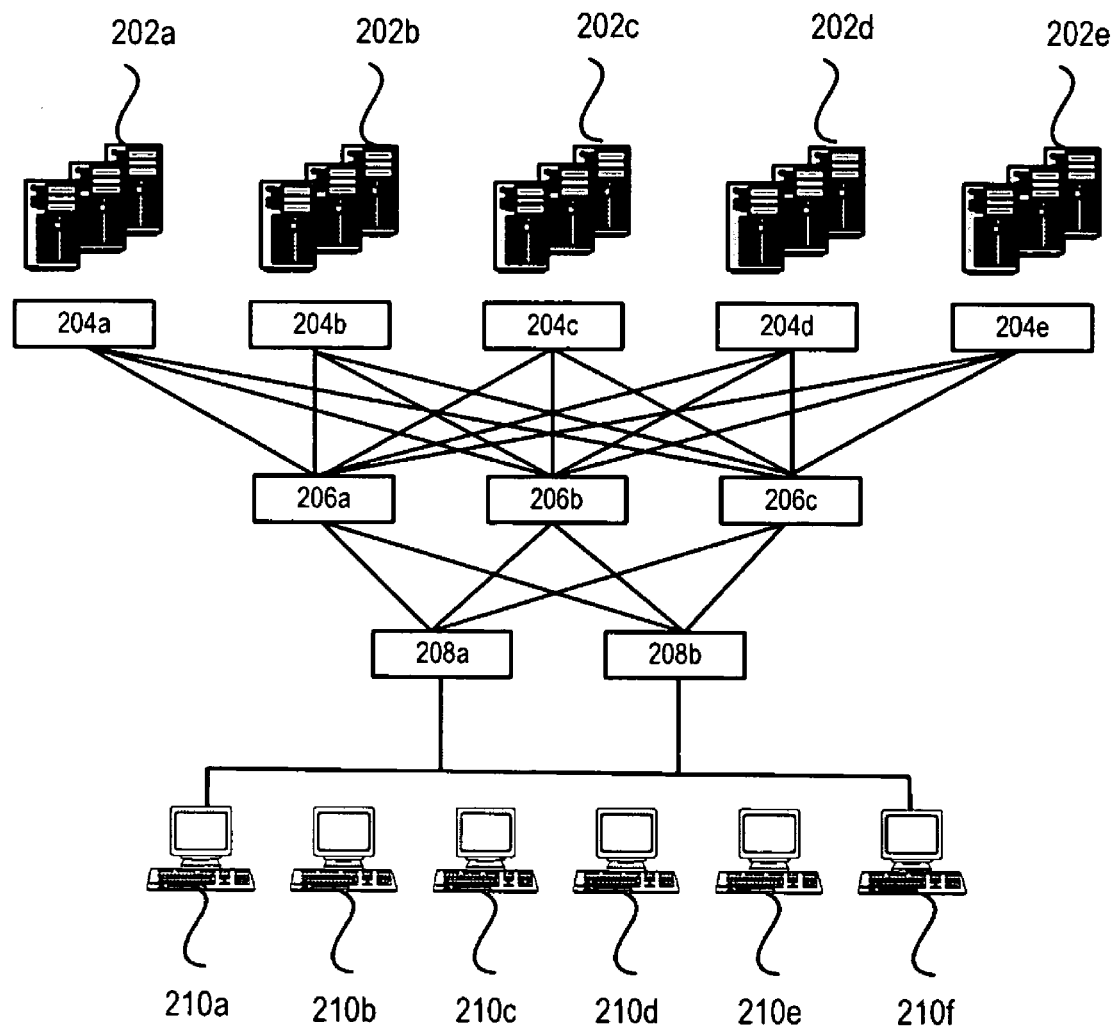
FIG. 2 shows an example of a homogeneous KVM switch environment.
Figure 3A:
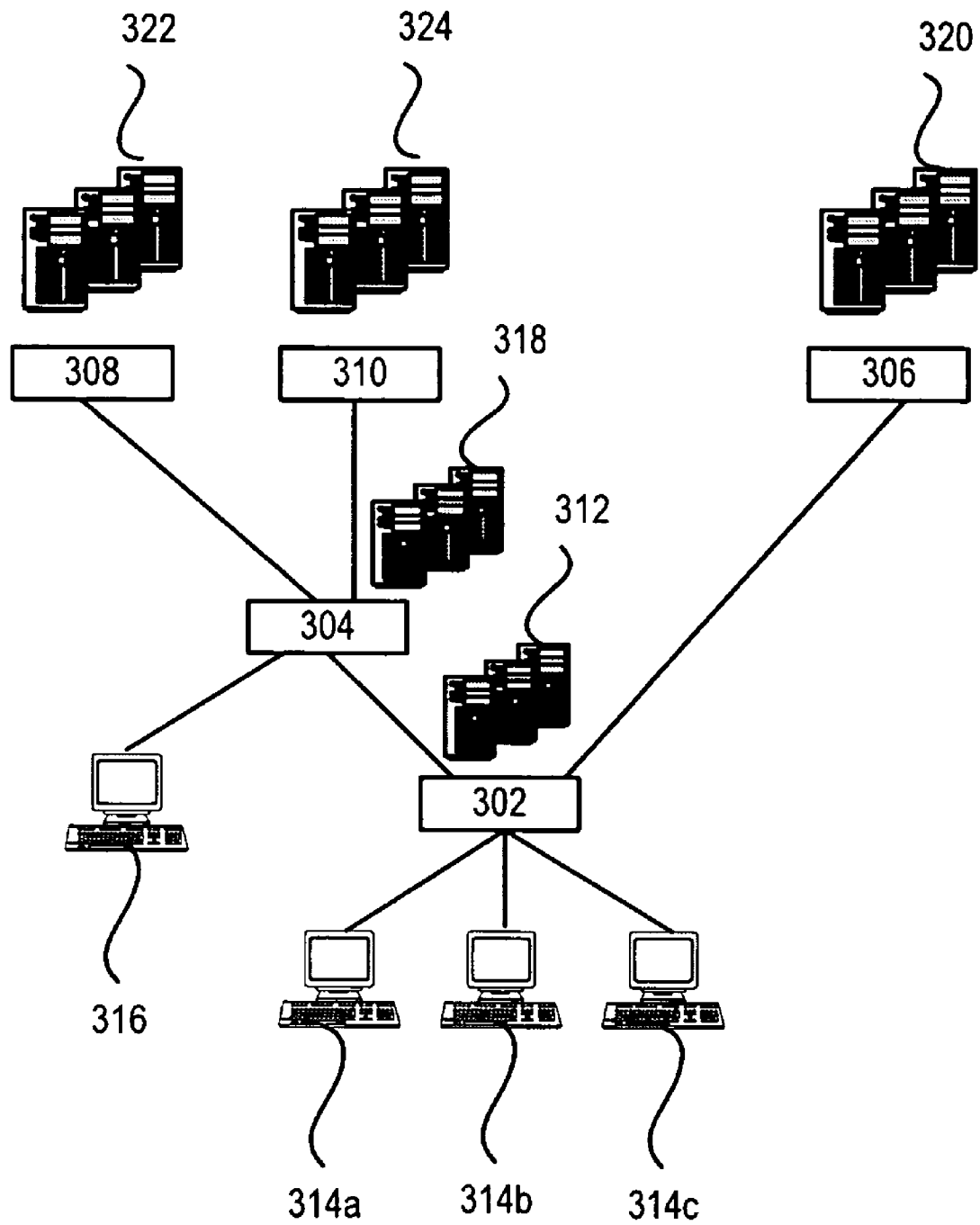
FIG. 3A shows an example of a heterogeneous KVM switch environment.
Figure 3B:
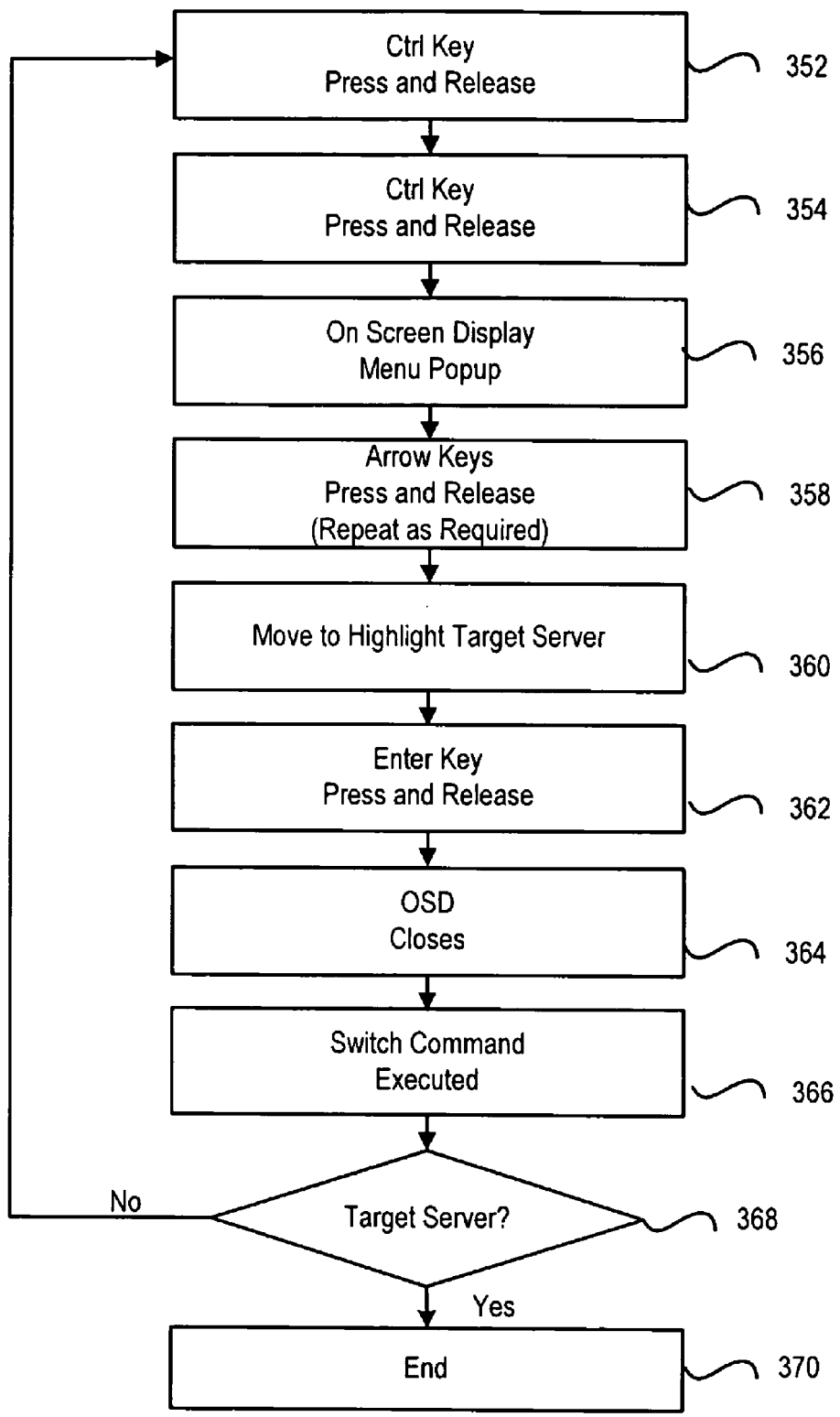
FIG. 3B represents a flowchart outlining the steps establishing data path connectivity in a heterogeneous switch environment.

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with embodiments of the present invention, there are provided desktop switching methods for establishing a complete data path between system devices and user interface devices through a connect request. As discussed herein, a connect request refers to a request to form a complete data path between a UID and a system device via UID switches. Also as discussed herein, complete data path refers to the data path that exists after the UID switches make the connection. Desktop switching further provides for a common user interface (UI) from which a plurality of user interface devices (UIDs) switches, system devices, and user interface devices (UIDs) may be selected.

As discussed herein, UID switches refer to switches that form a connection (either hardwired, in combination with other UID switches, or via a network such as an IP network) between a UID and a system device to allow data to be transmitted between the UID and the system device. An example of a UID switch may include, but is not limited to, a KVM switch. As discussed herein, a UID may include, but is not limited to monitor, keyboard, mouse, and trackball. Examples of system devices may include, but are not limited to, computers, servers, and power supply units.

In this document, various implementations may be discussed using UID switches as an example. This invention, however, is not limited to UID switches and may be employed with any device that supports remote switching and/or data acquisition including, but is not limited to, remote power devices, environmental and other data sensors, video over IP cameras, analog and digital keyboard-video-mouse switches, hybrids, and console servers.

In a simple local UID switch environment, a human operator may click on a desktop icon located on a host system device (i.e., currently selected or controlled system device) to establish data path connectivity. In an embodiment, the connect request may be sent by a controller (e.g., keyboard/mouse controller or video controller) in the host system device as a signal (e.g., bits pattern such as a waveform) to a UID switch, which may establish a complete data path between the UID and the target system device. However, if the UID switch is unable to receive/understand the signal from the controller, then the controller may alternatively send the signal to the UID, which may relay the signal to the UID switch.

The complexity of the switch environment may influence the type and capability of the desktop icon. In an embodiment, clicking on a desktop icon may send a signal to a two-port UID switch to change from the current system device to the other system device. In a complex UID switch environment (i.e., more than 2 ports), clicking on a desktop icon may display a populated list, in an embodiment. As discussed herein, a populated list refers to a popup or pull-down list or a panel that is used to display available system devices and/or UIDs from which the user may choose to indicate a request for connectivity.

In a complex remote UID switch environment, desktop switching may be a feature of a maintenance network management operating system (MNMOS). As discussed herein, MNMOS refers to an architectural arrangement that provides a user-friendly, remote, third party management network system to integrate dissimilar infrastructure technologies (e.g., UID switches, AC power, environmental sensors, data acquisition, video over IP, etc.) under a single application. Further, the MNMOS includes a database and user interface system that integrates the management of multiple heterogeneous products for a single point of access, management and control.

In an embodiment, the MNMOS is designed around a modular structure including a main shell, a database, and product specific modules that may define communication and commands for any number of remotely managed products and technologies. Further, the MNMOS may provide internal communication with the database and product specific modules that may define and translate commands sent to external hardware device. In an embodiment, the communication methods used to enable the MNMOS to provide a seamless network may include direct serial and TCP/IP network connections.

It should be noted that it is not a requirement that the MNMOS replaces the terminal on-screen display or keyboard hot-key methods of controlling a switch system. Instead, the MNMOS, in an embodiment, may consolidate control and management of multiple heterogeneous switching devices in various locations under a common user interface. In this manner, the MNMOS allows local, remote, and automated operators to activate switching functions that would normally be managed only at the controlling output port of a respective and/or compatible switch. In other words, the MNMOS may utilize the communication service port to provide the human operator greater operational control of input/output (I/O) ports across a heterogeneous UID switch environment. As discussed herein, a heterogeneous UID switch environment refers to an environment in which one or more UID switches employed by a company are of different brands, makes, and/or models. Note that heterogeneous switch environment may include homogeneous switches.

The MNMOS includes a switch command server (SCS). As discussed herein, a SCS may be hardware, software, and/or firmware that may be "in electronic communication" with the UID switches in that the SCS can communicate with and issue command to the UID switches, either directly or through protocol modules. In an embodiment, the SCS may provide the main user interface, advanced switching control methods as well as external communication with the other MNMOS modules and hardware devices. In other words, the SCS may manage the incoming requests for connectivity between a user interface device (UID) and a system device.

In an embodiment, the SCS may provide a UI that enables desktop switching. For illustration purposes, consider for example, a complex remote heterogeneous UID switch environment situation. In the prior art, a human operator employs a trial-and-error method (i.e., multiple user actions via OSD menus and/or keyboard commands) to determine data path connectivity by entering multiple UID switch commands. The situation may result in user frustration, particularly if the human operator operates in a large enterprise environment. Further, if the human operator is a remote IP user, additional user actions may be required to open a browser and to locate an access point.

With desktop switching, the human operator may click on a desktop icon to display a populated list. The user may employ a switch/location agnostic connectivity indication (SLACI) to request for connectivity between his UID and a specific system device. Unlike the prior art, the action steps to connect the two devices may be handled behind the scene by the SCS. The user no longer has to employ a trial-and-error method to establish data path connectivity. Instead, the SCS may employ advanced switching control methods as well as external communication with the hardware devices to establish data path connectivity.

As discussed herein, SLACI refers to a human-provided or machine-provided command or set of commands (i.e., one or more commands) to the SCS to connect a UID to a system device via a set of UID switches (i.e., one or more UID switches), or a set of UIDs (i.e., one or more UIDs) to a set of system devices (i.e., one or more system devices) via a set of UID switches. If the SLACI is human-originated, the SLACI may involve any user action that indicates the identity of the UID and the identity of the system device, along with an indication of a desire to connect the UID and the system device. Examples of such user action may include drag-and-drop, double-clicking, key-clicking, and hot key clicking. Refer to Table 2 for further details about these user actions.

In the case of a human-provided SLACI, the human-provided SLACI may be received via a SLACI-originating device, which may be a console that is under control by a user or a third-party administrator. If the SLACI is machine-provided, the SLACI may originate from a software, firmware, and/or hardware located anywhere on the network (i.e., not required to be part of the UID switch to be controlled) in response to a triggering condition, for example.

Furthermore, the SLACI is switch agnostic in the sense that the SLACI is generic with respect to the command syntax of any particular UID switch. Accordingly, the user may not need to change syntax of the SLACI when different switches are employed in the network. Thus, the user may be insulated from having to learn the specifics of a UID switch (since the specifics of any given UID switch is encapsulated in the protocol module, in an embodiment).

Additionally, the SLACI is location agnostic in the sense that the SLACI-originating device, whether a console to receive a human-provided SLACI or a module to generate a machine-provided SLACI, may be located anywhere on the network as long as the SLACI can be received by the SCS.

In an embodiment, the SCS may manage the data path connectivity by performing network discovery. As discussed herein, network discovery refers to a data acquisition process, which may involve identifying the devices (e.g., servers, consoles, UID switches, etc.) that may be on the network. Further, network discovery may determine hardware presence, data path types, their existence and availability in addition to data acquisition task.

Network discovery of data paths may use data from internal and/or external sources. To perform network discovery, the SCS may maintain an internal database that may include, but is not limited to, data on the I/O devices, the device types, the location of each device, the internal backbone structures of the switches, the internal-external connections between the devices and/or switches, and the current state of the internal-external connections. An external source of data may include, but is not limited to, data from SLACI.

The SCS may further manage the data path connectivity by performing protocol negotiations. As discussed herein, protocol negotiations refer to the process of determining the hardware devices that need to be switched (for routing a system device to a display device), querying the respective product libraries to obtain the appropriate switch command structures, using network discovery to determine data path existence, their types, and availability, building the individual switch commands and sending these commands to each switch device in order to align communication and control of a system device to a display device. Also as discussed herein, an available data path refers to a data path that may permit data to be transmitted between a UID and a system device if the UID switches in between connect the UID to the system device.

In an embodiment, a protocol module attached to the SCS may enable the SCS to perform protocol negotiations. As discussed herein, a protocol module refers to a library comprising of data specific to a switch. Thus, the number of protocol modules attached to the SCS may depend upon the number of diverse switches employed in the network. In an example, if there are five different switches (i.e., has different brand, make, or model), five possible protocol modules may exist.

The data for the protocol module, in an embodiment, may include the brand, make, and model of a UID switch. Also, the protocol module may include, but are not limited to, communication method (e.g., analog, KVMoIP, PCI KVMoIP, console server, etc.), type of ID (e.g., binary, IP address, user name, etc.), method of initializing the UID switch, I/O string, authentication method, acceptable actions, command structures, and port information.

To illustrate how a local, remote, or automated operator's request may be managed in the MNMOS arrangement, consider the situation wherein, for example, a user wants to connect his UID to a system device. By using desktop switching, the user may employ a SLACI to send a request for connectivity. Upon receiving the signal, the SCS may start establishing data path connectivity.

As part of executing switch commands, the SCS may verify security, data path existence, and data path availability. Since the devices in the network may have already been associated with specific data stored on the SCS, the SCS may use internal network discovery to determine data path existence and availability. In other words, the SCS may analyze if and what communication path exists between devices, including devices connected to heterogeneous switches. This is in contrast with the prior art, whereas data about switch devices tends to be limited to the knowledge held by the operating system of a specific switch. Feedback may be provided to the operator if no data path exists or the data path is unavailable.

The SCS may also validate a user's access rights. In an embodiment, the SCS may employ an authentication module to perform the verification. As discussed herein, an authentication module refers to a database that includes user specific information including user's access rights. By using the authentication module, the SCS may provide the necessary authentication data at each switch. Further, the authentication module may provide security for switches that may not have authentication capability. Feedback may be provided to the operator if authentication fails.

Once verification has been completed, the SCS may assemble switch command(s) by applying the command structures/protocols stored in the protocol module(s) along with data previously collected or retained through network discovery. Then, the SCS may execute, in a sequential manner, the switch command(s) at the various switches in the data path. Once all switch commands have been properly assembled, validated and executed, a complete data path may be established. As discussed herein, a complete data path refers to the data path that exists after the UID switches make the connection.

In another embodiment, the MNMOS may also provide for group switching. As discussed herein, group switching refers to the process of employing a SLACI to connect a group of UIDs (i.e., two or more UIDs) to a group of system devices (i.e., two or more system devices). In the prior art, certain UID switches may allow a fixed set of system device ports to be switched as a group. The systems device ports may be physically bound in a fixed order; thus, an internal operating system may switch a fixed order of system device ports to a fixed order of an equal number of UID device ports. The human operator tends to have limited control over the order in which system devices are switched to UIDs. To change the order, the human operator may have to physically change the order of system devices on the UID switch.

Unlike the prior art, group switching is not limited by hardware capability of the UID switches. Instead, group switching may be employed to switch a plurality of system devices to a plurality of UIDs regardless of the hardware capability of the UID switches. An embodiment of the invention allows the human operator to dynamically arrange the order in which system devices are switched to UIDs, add and/or remove components of the group, and store multiple group profiles that can be utilized at any time. Hence, a human operator may create multiple groups of system devices where each system device may reside on one or more (homogeneous or heterogeneous) UID switches/locations. Also, the human operator may create multiple groups of UIDs where each UID may reside on one or more UID switches/locations.

In group switching, when a switch command structure is assembled to execute operations on multiple components of the same switch, the procedure may be executed in a loop until the last switch command is assembled and executed. In an example, a user wants to connect two UIDs with two system devices. Two UID switches are located on the data paths between the two devices. Hence, to enable connection, switch commands may be performed multiple times at each of the UID switches.

In yet another embodiment, the MNMOS may provide for third party switching. As discussed herein, third party switching refers to the process of connecting a UID to a system device in which the action is initiated by a third party. In other word, the human/machine operator making the request for connectivity may be employing a SLACI to establish connectivity between another user's UID and a specific system device.

Third party switching may be performed manually (e.g., drag-and-drop switching, double click switching, key-click switching, or hot key switching). Additionally, third party switching may be performed automatically based on an operator-defined profile stored in the MNMOS and/or its associated modules. As discussed herein, profile refers to instructions for automatically executing a switch commands based on time, network events, and user scripts.

In yet another embodiment, the MNMOS may provide for remote user access. As discussed herein, remote user refers to an operator who may not be hardwired to UID switches and may request connectivity via an IP connection. This is in contrast to a local user who may be hardwired to UID switches. Since communication methods employed by the MNMOS may include TCP/IP network, remote user may be able to work from anywhere in the world and still may be able to access digital and analog switch environments. In an example, a remote user residing in Hong Kong requests for a connection with a system device located in New York. In the prior art, the remote user may have to open a browser, point to an IP access point, and use a trial-and-error method to establish a data path at each UID switch. Unlike the prior art, the SCS and modules may perform these functions automatically by opening a browser, connecting to and passing log-in data to an available IP access point while aligning data paths between the UID switches. With MNMOS, geographical limitations may be eliminated.

Figure 4:
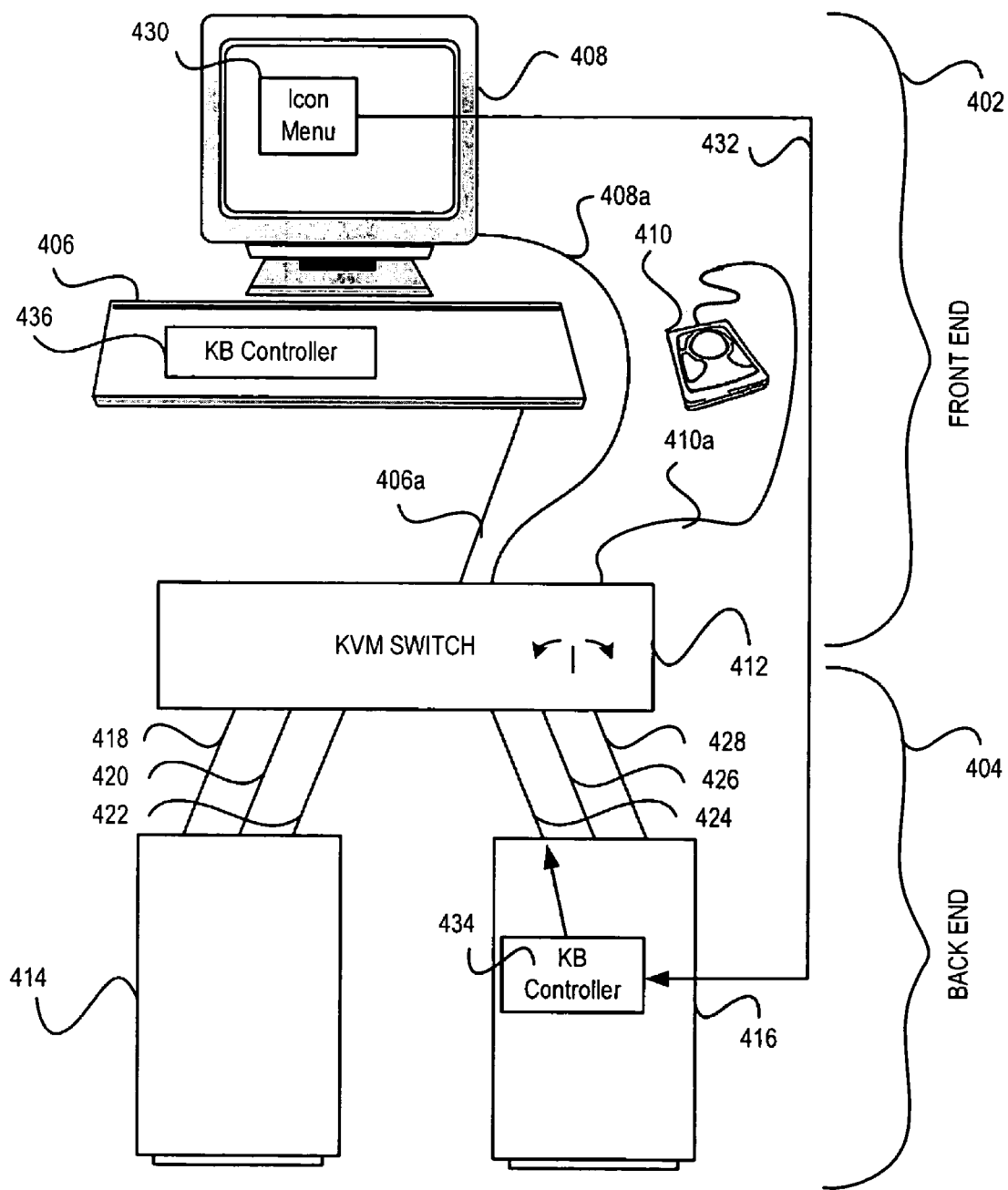
FIG. 4 shows, in an embodiment, a diagram illustrating desktop switching in a simple local KVM switch environment by using a keyboard controller.

The features and advantages of embodiments of the invention may be better understood with reference to the figures and discussions that follow. FIG. 4 shows, in an embodiment, a diagram illustrating desktop switching in a simple local UID switch environment by using a keyboard controller. The switch configuration may be divided into two sections, a front end 402 and a back end 404. Front end 402 may include a keyboard 406, a video monitor 408, a mouse 410, and cable cords (406a, 408a, and 410a) connecting the aforementioned UIDs to a UID switch 412. Back end 404 may include a system device 414 which may be connected to UID switch 412 via a keyboard cable 418, a mouse cable 420, and a video cable 422. Additionally, a system device 416 may be connected to UID switch 412 by a keyboard cable 424, a mouse cable 426, and a video cable 428.

In an embodiment, a user may automatically switch from host system device 416 to target system device 414 by clicking on a desktop icon 430. In the prior art, the request for connectivity may be sent from a keyboard controller 436 on keyboard 406 to UID switch 412 via keyboard cable 406a, which may connect keyboard 406 to target system device 414. Unlike the prior art, a keyboard controller 434 on system device 416 may send a signal (e.g., bit patterns) to UID switch 412 via keyboard cable 424 to switch from system device 416 to system device 414. If UID switch 412 is unable to receive a signal from keyboard controller 434, then keyboard controller 434 may send the signal to keyboard 406, which may relay the signal to UID switch 412 via keyboard cable 406a to switch from system device 416 to system device 414.

Similarly, mouse 410 may be switched to the aforementioned keyboard example. Since the same keyboard controller may control both the keyboard and the mouse, mouse 410 may be switched from system device 416 to system device 414 via keyboard controller 434. In this embodiment, the keyboard controller may be interacting with the mouse cable instead of the keyboard cable.

Figure 5:
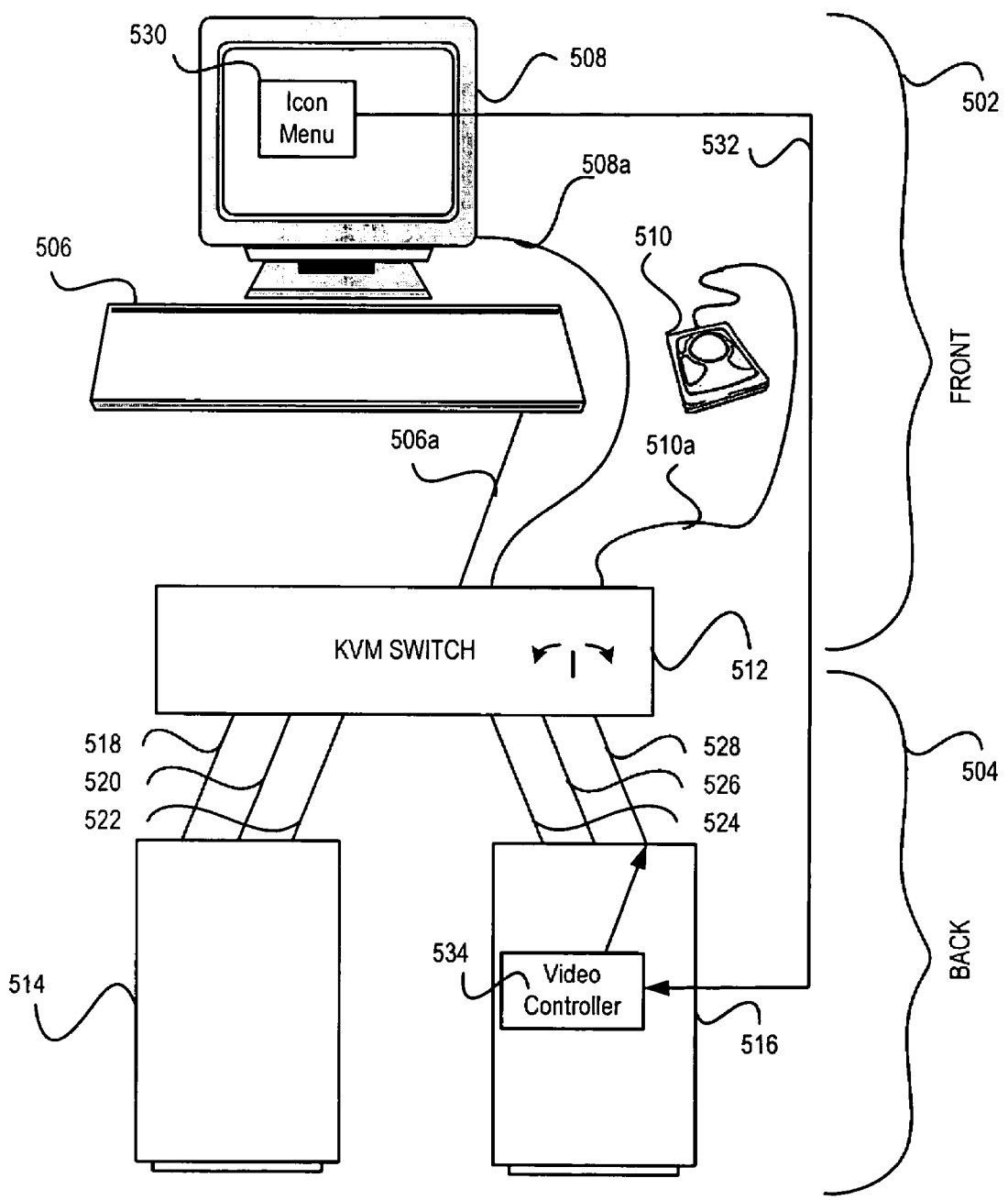
FIG. 5 shows, in an embodiment, a diagram illustrating desktop switching in a simple local KVM switch environment by using a video controller.

FIG. 5 shows, in an embodiment, a diagram illustrating desktop switching in a simple local UID switch environment by using a video controller. The switch configuration may be divided into two sections, a front end 502 and a back end 504. Front end 502 may include a keyboard 506, a video monitor 508, a mouse 510, and cable cords (506a, 508a, 510a) connecting the aforementioned UIDs to a UID switch 512. Back end 504 may include a system device 514 which may be connected to the UID switch 512 via a keyboard cable 518, a mouse cable 520, and a video cable 522. Additionally, system device 516 may be connected to UID switch 512 by a keyboard cable 524, a mouse cable 526, and a video cable 528.

Request for connectivity via a video controller (e.g., VGA controller) is similar to the aforementioned keyboard controller situation detailed in FIG. 4. Upon clicking on a desktop icon 530, a request for connectivity may be sent from a video controller 534 on system device 516 to UID switch 512 via video cable 528, which may switch from system device 516 to system device 514. Alternatively, if the UID switch is unable to receive the signal from the keyboard controller, then keyboard controller 534 may send the signal to video monitor 508, which may relay the signal to UID switch 512 to switch from system device 516 to system device 514.

The signal that is sent may be one or more bit patterns. The type of bit patterns that may be formulated may vary depending upon a number of factors including, but not limited to the type of UID switches and their methods of recognizing switch commands, the type of keyboard controller processor on the host system device, the bus interface between the I/O devices, how the UID switch may be connected, and the operating system of the system device. In an embodiment, the bit patterns that may be formulated may be two to 64 bits. Further, the bit patterns may include keyboard commands commonly found in the current keyboard command set. Table 1 below shows an example of a host computers keyboard command set. Keyboard command set may differ depending upon the keyboard and keyboard driver. However, the bit pattern that may be formulated may include command codes that are an augmentation of the current keyboard command set or may be those not commonly found in the current or typical host computers keyboard command set. For these command codes, a translator may be incorporated to translate the command codes into a language that UID switches may understand.

TABLE 1

Example of Keyboard Command Codes
(as of Jul. 26, 2005)
http://www.arl.wustl.edu/~lockwood/class/cs306/books/artofasm/Chapter_20/CH20-2.html

| Value (hex) | Description |
| --- | --- |
| ED | Send LED bits. The next byte written to port 60h updates the LEDs on the keyboard. The parameter (next) byte contains:<br>    bit 0: Scroll lock LED (1 = on, 0 = off).<br>    bit 1: Numlock LED (1 = on, 0 = off).<br>    bit 2: Capslock LED (1 = on, 0 = off).<br>    bits 3–7: Must be zero. |
| EE | Echo commands. Returns 0EEh in port 60h as a diagnostic aid. |
| F0 | Select alternate scan code set (PS/2 only). The next byte written to port 60h selects one of the following options:<br>    00: Report current scan code set in use (next value read from port 60 h).<br>    01: Select scan code set #1 (standard PC/AT scan code set).<br>    02: Select scan code set #2.<br>    03: Select scan code set #3. |

TABLE 1-continued

Example of Keyboard Command Codes
(as of Jul. 26, 2005
http://www.arl.wustl.edu/~lockwood/class/cs306/books/artofasm/Chapter_20/CH20-2.html)

| Value (hex) | Description |
| --- | --- |
| F2 | Send two-byte keyboard ID code as the next two bytes read from port 60h (PS/2 only). |
| F3 | Set Auto-repeat delay and repeat rate. Next byte written to port 60h determines rate:<br>    bit 7: must be zero<br>    bits 5, 6: Delay. 00- ¼ sec, 01- ½ sec, 10- ¾ sec, 11- 1 sec.<br>    bits 0–4: Repeat rate. 0- approx 30 chars/sec to 1Fh- approx 2 chars/sec. |
| F4 | Enable keyboard. |
| F5 | Reset to power on condition and wait for enable command. |
| F6 | Reset to power on condition and begin scanning keyboard. |
| F7 | Make all keys auto-repeat (PS/2 only). |
| F8 | Set all keys to generate an up code and a down code (PS/2 only). |
| F9 | Set all keys to generate an up code only (PS/2 only). |
| FA | Set all keys to auto-repeat and generate up and down codes (PS/2 only). |
| FB | Set an individual key to auto-repeat. Next byte contains the scan code of the desired key. (PS/2 only). |
| FC | Set an individual key to generate up and down codes. Next byte contains the scan code of the desired key. (PS/2 only). |
| FD | Set an individual key to generate only down codes. Next byte contains the scan code of the desired key. (PS/2 only). |
| FE | Resend last result. Use this command if there is an error receiving data. |
| FF | Reset keyboard to power on state and start the self-test. |

Figure 6:
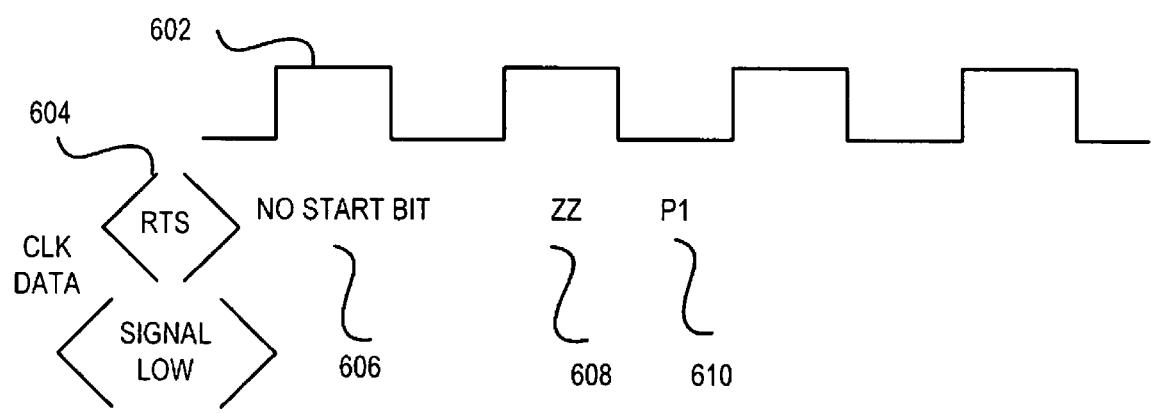
FIG. 6 shows, in an embodiment, an example of a bit pattern that may be forwarded to a KVM switch.

FIG. 6 shows, in an embodiment, an example of a bit pattern that may be forwarded to a UID switch. FIG. 6 is discussed in relation to FIG. 4 to illustrate how a signal is sent to a UID switch from a keyboard controller on a host system device. Once a request for connectivity has been sent to the keyboard controller, keyboard controller 434 may create a signal such as a waveform 602 to be sent to UID switch 412. Waveform 602 may include a ready-to-send (RTS) 604, which is a low clock data signal that may wake UID switch 412. Unlike a keyboard controller on a keyboard, keyboard controller 434 on system device 416 may not include a start bit. In an embodiment, the start bit may be sent as a no start bit 606 (i.e., empty). Following no start bit 606 may be a two bit alphanumeric character 608 (e.g., ZZ) which may initialize UID switch 412. The final two bit alphanumeric character 610 may identify the port from which the target system device may be connected to the UID switch.

Figure 7A:
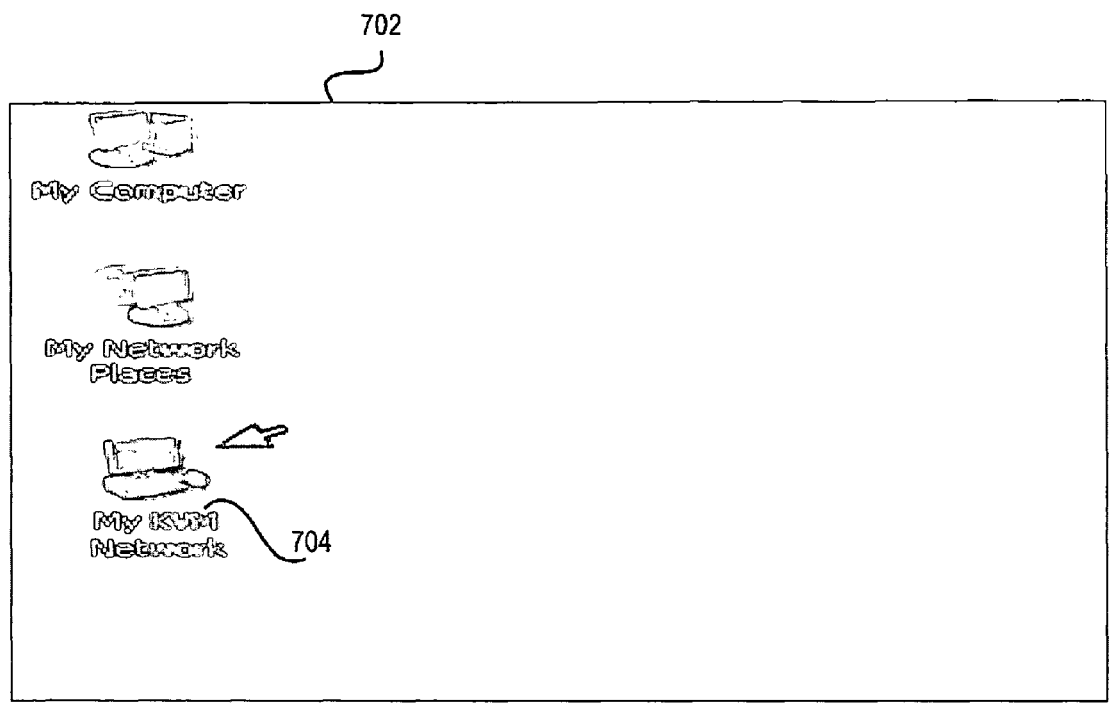
FIGS. 7A and 7B show two embodiments of UI for desktop switching in a simple KVM switch environment.
Figure 7B:
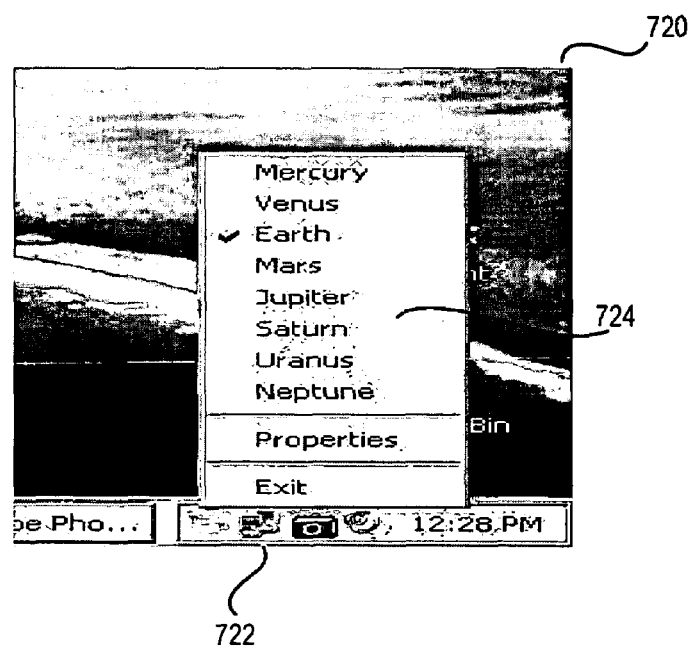

FIGS. 7A and 7B show two embodiments of UI for desktop switching in a simple UID switch environment. FIG. 7A shows, in an embodiment, a UI for a two-port UID switch. From a desktop 702, a human operator may click on a desktop icon 704 to request for connectivity with a target system device. Since there is at maximum two system devices connected to the UID switch, a click on desktop icon 704 may automatically connect the human operator to the target system device.

FIG. 7B shows, in an embodiment, a UI for a UID switch with a plurality of ports (i.e., more than 2 ports). From a desktop 720, a human operator may click on a desktop icon to request for connectivity with a target system device. In an embodiment, the icon may be a located on the desktop or in the system tray. By activating icon 722, a list of available system devices 724 may appear allowing the human operator to select the target system device.

Figure 8:
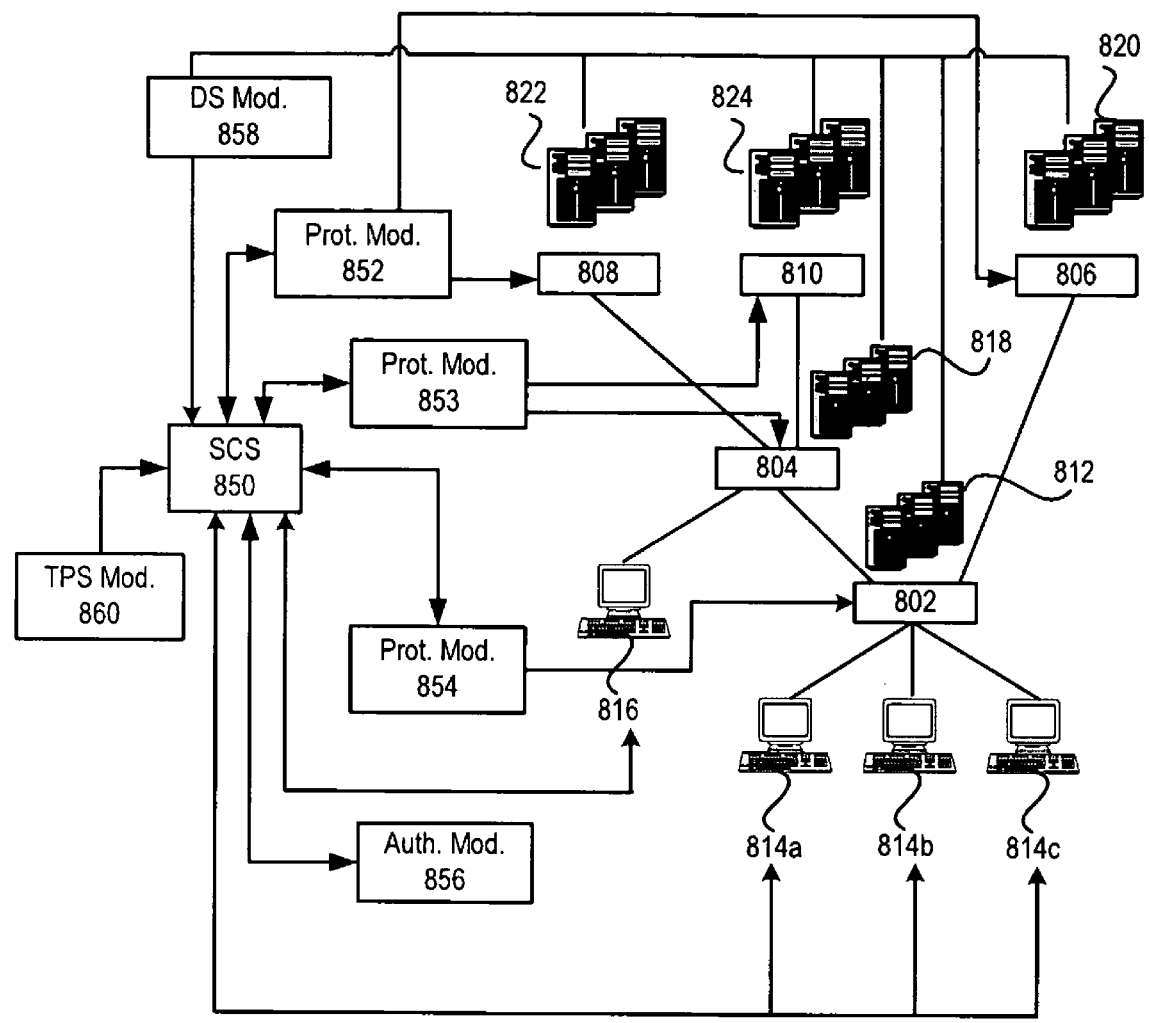
FIG. 8 shows, in an embodiment, a MNMOS that is superimposed on a heterogeneous UID switch environment.

In a complex remote UID switch environment, desktop switching may be a feature of a MNMOS. FIG. 8 shows, in an embodiment, a MNMOS that is superimposed on a heterogeneous UID switch environment. The switch environment includes a UID switch 802 connected to UID switches 804 and 806, and UID switch 802 is also connected to UID switches 808 and 810 via UID switch 804. Further, a group of system devices (GOSD) 812 and UIDs 814a, 814b, and 814c are connected to UID switch 802. Also, a UID 816 and a GOSD 818 are connected to UID switch 804, and a GOSD 820 is connected to UID switch 806. In addition, GOSDs 822 and 824 are attached to UID switches 808 and 810, respectively. The MNMOS may include a SCS 850, protocol modules (852, 853, and 854), an authentication module 856, a desktop switching module 858, and a third party switching module 860.

Consider the situation wherein, for example, a user at UID 814c may want to connect to GOSD 822 by performing a SLACI. By employing desktop switching module 858, the laborious task of using keyboard commands and/or scrolling through OSD(s) to establish data path connectivity may be reduced to a SLACI to request for data path connectivity.

Figure 9A:
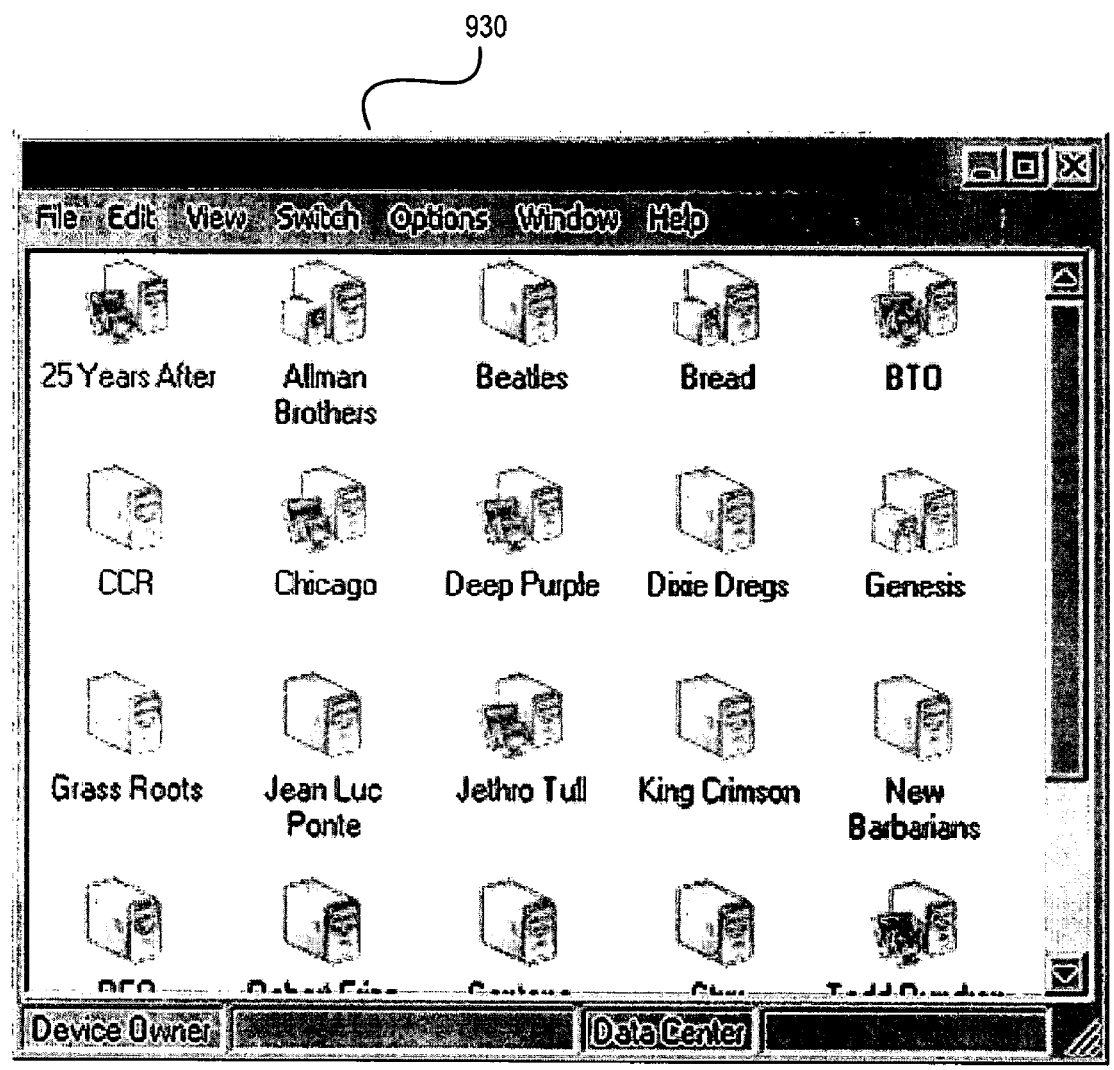
FIGS. 9A and 9B show two embodiments of UI for desktop switching in a complex KVM switch environment.
Figure 9B:
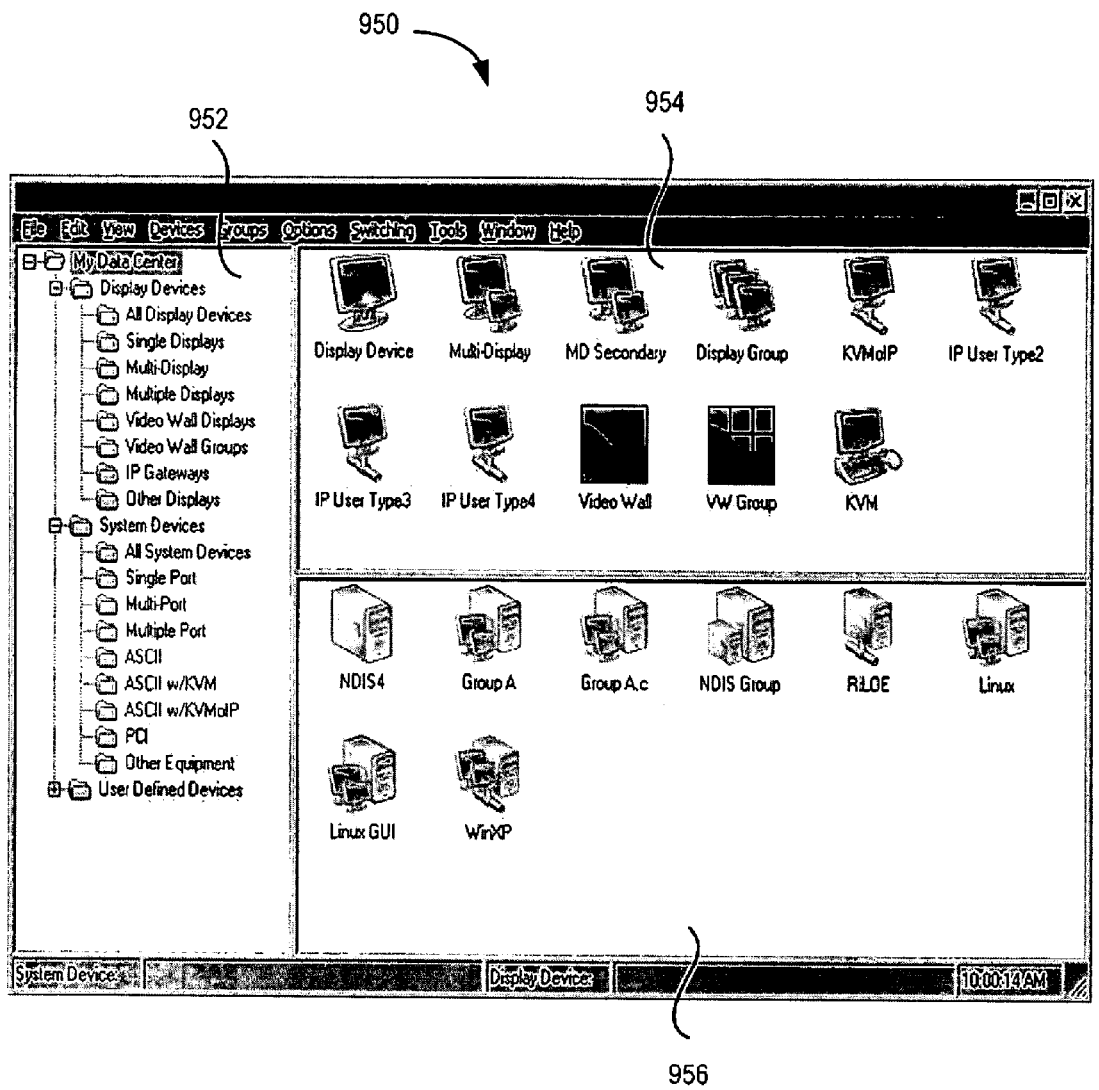

FIGS. 9A and 9B show two embodiments of populated list for desktop switching in a complex UID switch environment. FIG. 9A shows, in an embodiment, a one panel populated list displaying a plurality of system devices. In an example, user at UID 814c may employ populated list 930 to display a plurality of icons representing the available system devices. By clicking on one of the icons, the human operator may send a request for data path connectivity.

FIG. 9B illustrates, in an embodiment, a multiple panel populated list displaying a plurality of system devices. In an example, the user at UID 814c may employ a populated list 950 that may include three panels (952, 954, and 956) to request for connectivity with GOSD 822. Panel 952 may show a tree-like structure with a plurality of types and physical locations of UIDs and system devices. The available UIDs may be clustered in the upper right window (panel 954) and the available system devices may be clustered in the lower right window (panel 956). In this example, the user at UID 414c may request connectivity by dragging a system device in panel 956 (i.e., GOSD 822) to his UID in panel 954 (i.e., UID

414c). Depending on administrator and user option settings, the same commands may be executed by reversing the drag and drop action.

Referring back to the example in FIG. 8, once the user has completed the user action to create the connectivity, no additional user interaction may be needed. Unlike the prior art, SCS 850 may perform advanced switching control logic, in an embodiment, to establish data path connectivity. The SCS may manage the data path connectivity by continuously performing data path management and protocol negotiations. In an embodiment, protocol modules (852, 853, and 854) attached to SCS 850 may enable SCS 850 to perform protocol negotiations. Protocol modules (852, 853, and 854) are optional modules. Generally, the number of protocol modules attached to the SCS may vary depending upon the number of heterogeneous switches.

Figure 10:
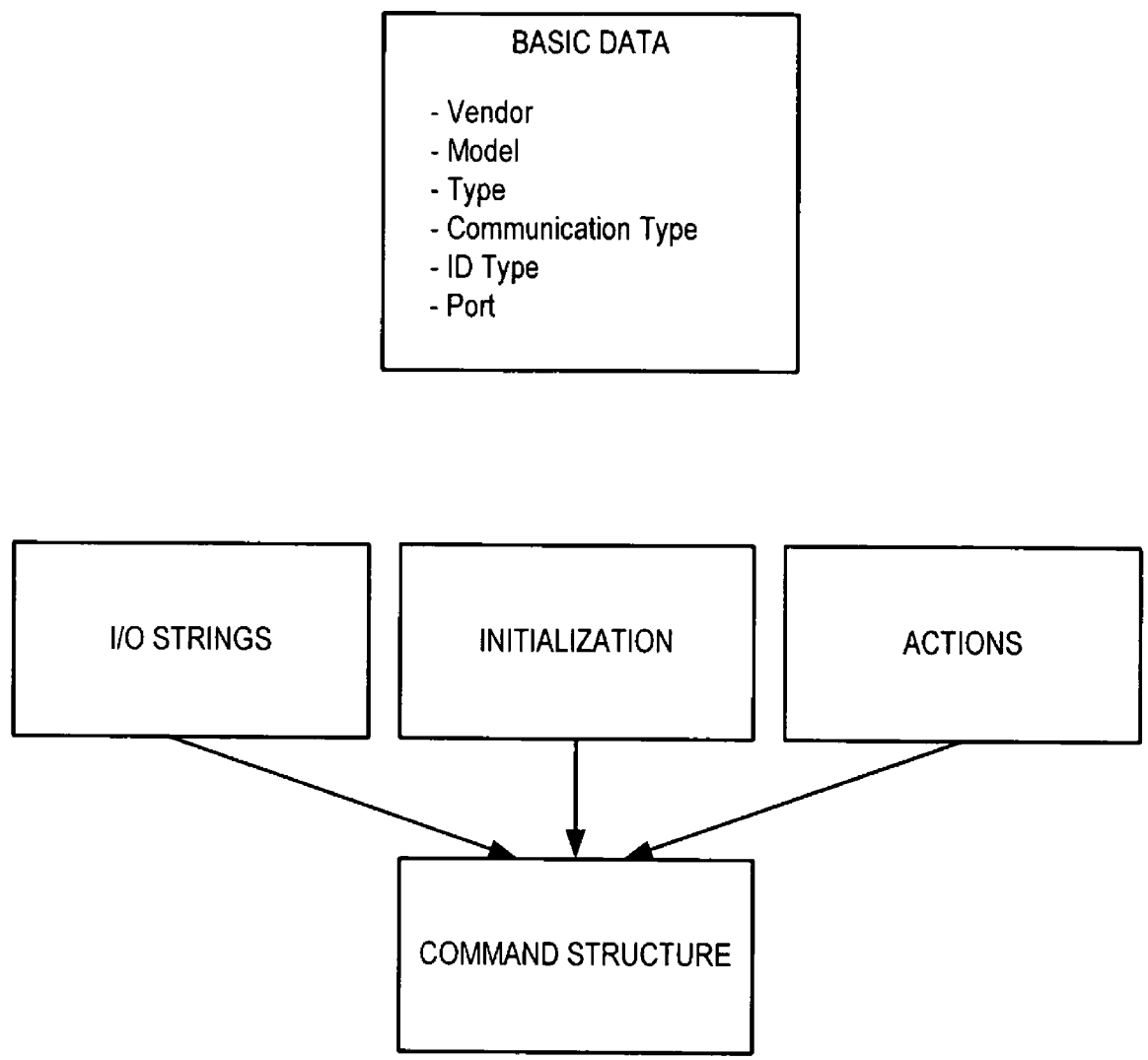
FIG. 10 shows, in an embodiment, a protocol module.

FIG. 10 shows, in an embodiment, a protocol module. The protocol module may include some basic information about a UID switch, such as vendor, model, type, communication type, ID type, and ports. More details are provided in Table 2 below. In addition, the protocol module may also include data that may be employed to formulate the command structure for the switch. In an example, the command structures may include initialization data (i.e., keyboard commands), I/O string data, and actions. As discussed herein, actions refer to a list of acceptable actions that a UID switch may perform.

TABLE 2

Basic Information for Protocol Module

| Name | Description | Examples |
| --- | --- | --- |
| Vendor | Name of the manufacturer | Avocent, Raritan, Cybex, Belkin |
| Model | The model name | 8 × 32, 16 × 64 |
| Type | Communication methodology | analog, kvm/ip hybrid, PCI KVM/IP, or console serve |
| Communication type | Method for communicating with other devices | serial, IP, ASCII commands over IP |
| ID Type | Data about the structure of a command stream | binary, IP address, user name |
| Ports | Data about the ports on the UID switch | number of ports, port Ids, port address |
| Data Acquisition | Component details | Serial numbers, part numbers, current state, status and testing information of internal components |
| Data Path Testing | Connectivity Validation | Testing the correct and valid state of internal and external components of the UID switch hardware like wiring, proper interconnectivity and communication paths between UID switch hardware |

Referring back to FIG. 8, SCS 850 may further manage data path connectivity by performing network discovery, in an embodiment. To enable network discovery, SCS 850 may maintain a database that may include, but are not limited to data on the I/O devices, the device types, the location of each device, the internal backbone structures of the switches, the internal-external connections between the devices and/or switches, and/or the current state of the internal-external connections.

Figure 11:
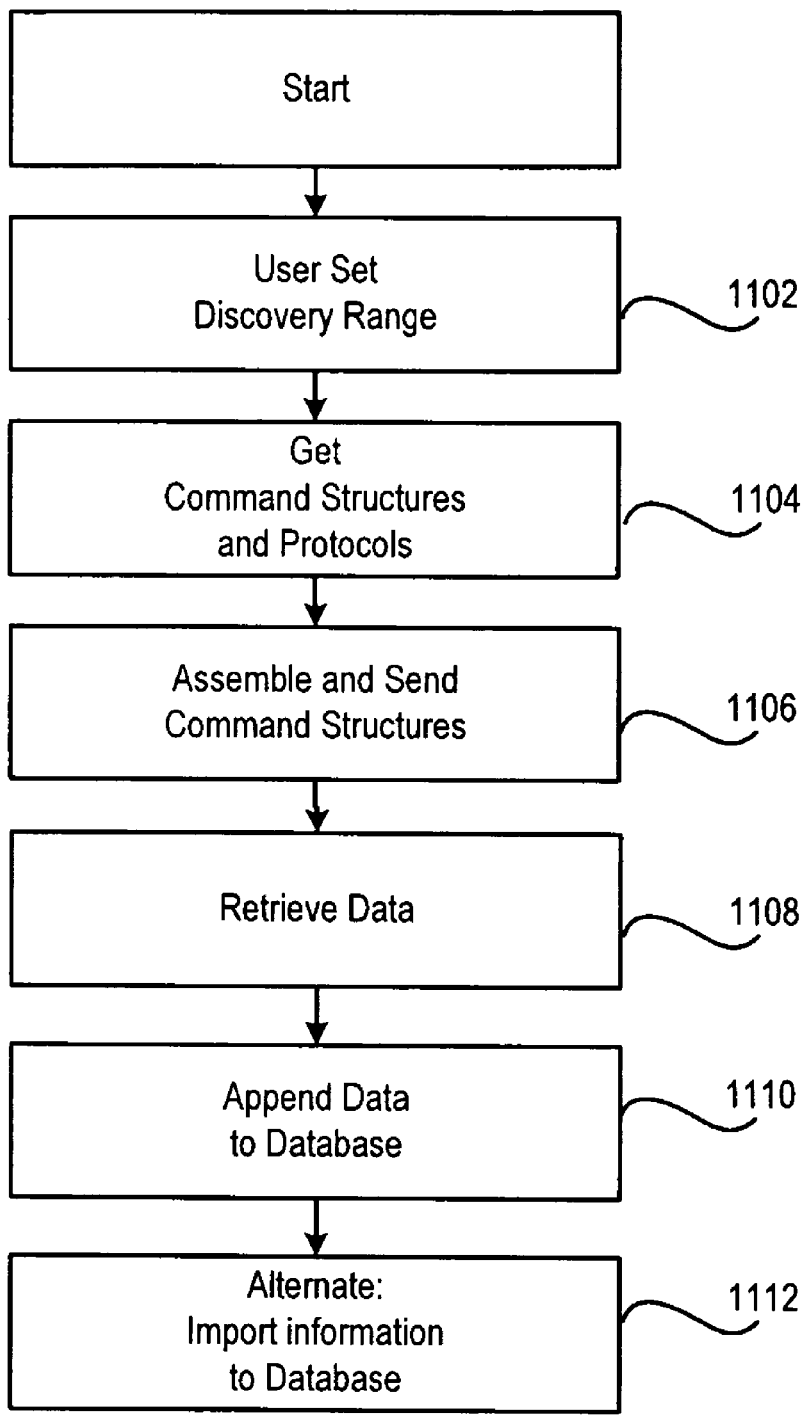
FIG. 11 shows, in an embodiment, a flowchart outlining the steps for collecting the pertinent data used in the network discovery process.

FIG. 11 shows, in an embodiment, a flowchart outlining the steps for collecting the pertinent data used in the network discovery process. The administrator may start the process (step 1102) by setting a discovery range (e.g., want to find all of the Raritan products). The SCS may then gather the various command structures from the protocol modules (step 1104). The command structures may be sent (step 1106) to retrieve information from each UID switch and server (step 1108). The information collected from the UID switches and servers may be appended to a database (step 1110) stored by the SCS or other modules. Alternatively, if the information is readily available, the administrator may upload the information to the database (step 1112).

Referring back to FIG. 8, prior to executing switch commands, SCS 850 may verify security by using authentication module 856, in an embodiment. By using authentication module 856, SCS 850 may provide the necessary authentication data at each switch. Further, authentication module 856 may provide security for switches that may not have authentication capability and interact with existing external security services.

Figure 12:
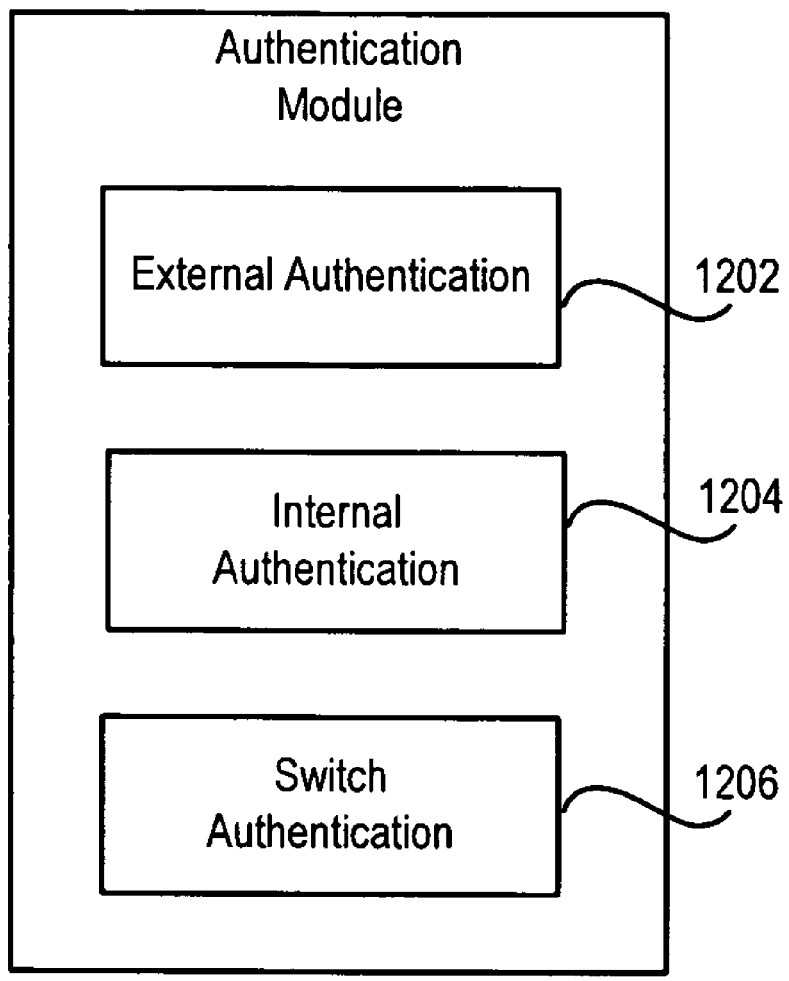
FIG. 12 shows, in an embodiment, an authentication module.

FIG. 12 shows, in an embodiment, an authentication module. Authentication may occur through three methods: an external authentication method 1202, an internal authentication method 1204, and a switch authentication method 1206. Consider the situation wherein, for example, a user wants to connect to a system device. To connect to a UID switch, the SCS may first apply external authentication method 1202 (e.g., L-Dap, radius or Active directory, etc.). However, if an external authentication method is not applicable, then the SCS may apply internal authentication method 1204 (i.e., preset options as determined by an administrator). If neither external nor internal authentication methods exist, then the SCS may apply switch authentication method 1206 (e.g., authentication specific to a switch). Note that any switch authentication method may be applied before other authentication methods.

Referring back to FIG. 8, the MNMOS may also provide for third party switching module 860, in an embodiment. Third party switching may be performed manually (e.g., drag-and-drop switching, double click switching, key-click switching, or hot key switching) or automatically (e.g., time switching, event switching, or echo switching) by a third party. Refer to Table 3 below for descriptions of the various third party switching methods. Generally, with the automatic third party switching approach, the SCS may access profiles (e.g., instructions for performing a switch) that a user may have previously set up.

TABLE 3

Third-Party Switching

| Approach | Method | Description |
| --- | --- | --- |
| Manual | Drag-and-drop | Drag a system device to a user interface device using a computer pointing device, which may include mouse, track pad, track ball, etc . . . |
| Manual | Double clicking | Click twice on a system device or a UID |
| Manual | Key click | Select a user interface device, presses a key modifier, and then selects a system device |
| Manual | Hot key | Preset keys to give commands for selecting a system device |
| Automatic | Time | Switching occurs at a specific time |
| Automatic | Event | Switching occurs due to a specific event |
| Automatic | Echo | Switching occurs to an administrator user interface device when a sensitive system device is accessed |

TABLE 3-continued

Third-Party Switching

| Approach | Method | Description |
|---|---|---|
| Automatic | Sequenced | Switching occurs in a specific sequence of server ports at specified intervals |
| Automatic | User Scripts | Switching occurs due to user defined events (i.e. completion of a test process) |
| Automatic | Group | Switching occurs based on actions taken on user defined device groups |
| Automatic | Desktop | Switching occurs due to actions taken at a selected server |

Figure 13A:
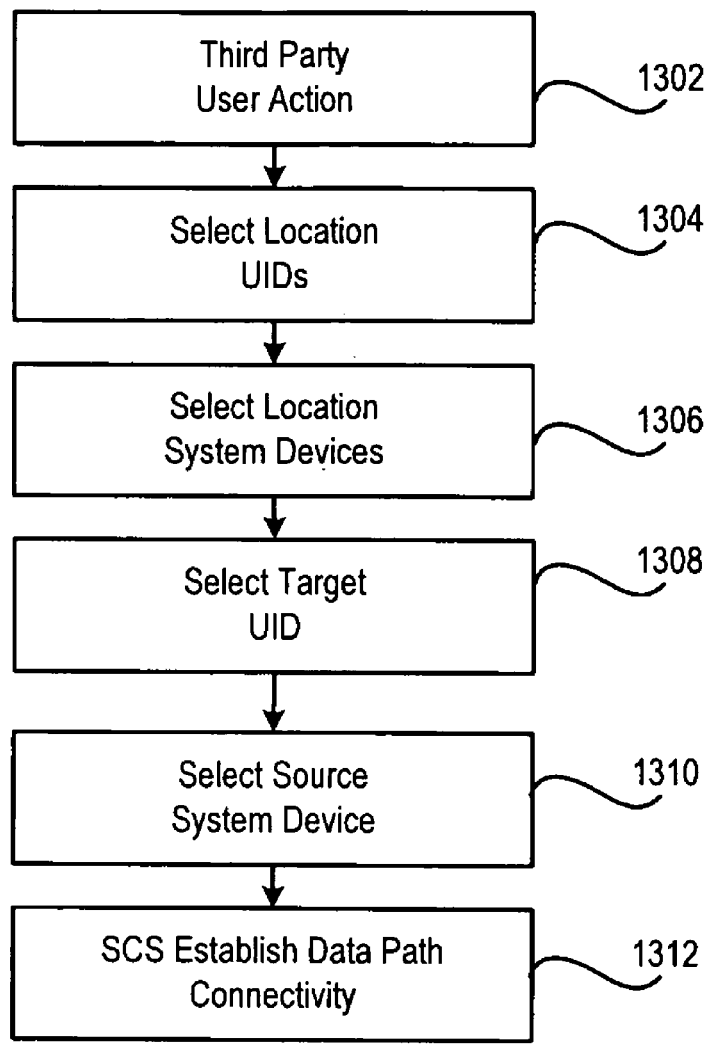
FIG. 13A shows, in an embodiment, a simplified flow chart representing the steps for handling a manual third party switching.

FIG. 13A shows, in an embodiment, a simplified flow chart representing the steps for handling a manual third party switching. FIG. 13A is discussed in relation to FIG. 8. At step 1302 a third party user (e.g., administrator) at UID 816 may request for connectivity between UID 814c and GOSD 822. The third party user at UID 816 may first select a location of UIDs (step 1304) and a location of system devices (step 1306). Once the UIDs and system devices are displayed on the third party user's console (i.e., UID 816), the third party user may select a UID (step 1308), such as UID 814c, and a source system device (step 1310), such as GOSD 822. At step 1312, the SCS may establish data path connectivity between UID 814c and GOSD 822.

Figure 13B:
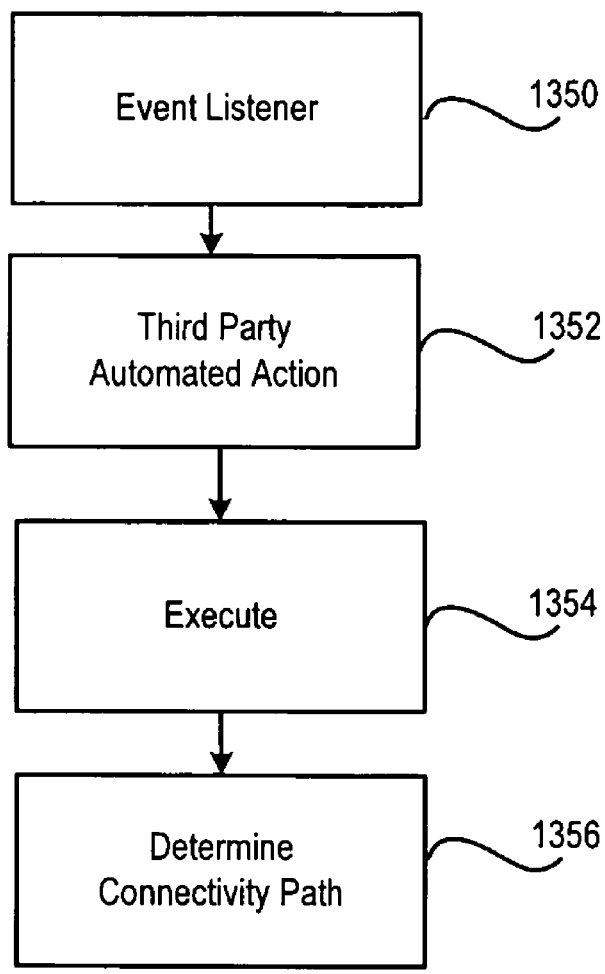
FIG. 13B shows, in an embodiment, a simplified flow chart representing the steps for handling an automatic third party switching.

FIG. 13B shows, in an embodiment, a simplified flow chart representing the steps for handling an automatic third party switching. Before automatic third party switching may occur, the user may create a profile for each switching event. Once an event listener identifies an event (step 1350) as one of the preset profiles, an automatic action may occur (step 1352). With the execution of the event (1354), the SCS may begin establishing data path connectivity (step 1356).

Figure 14:
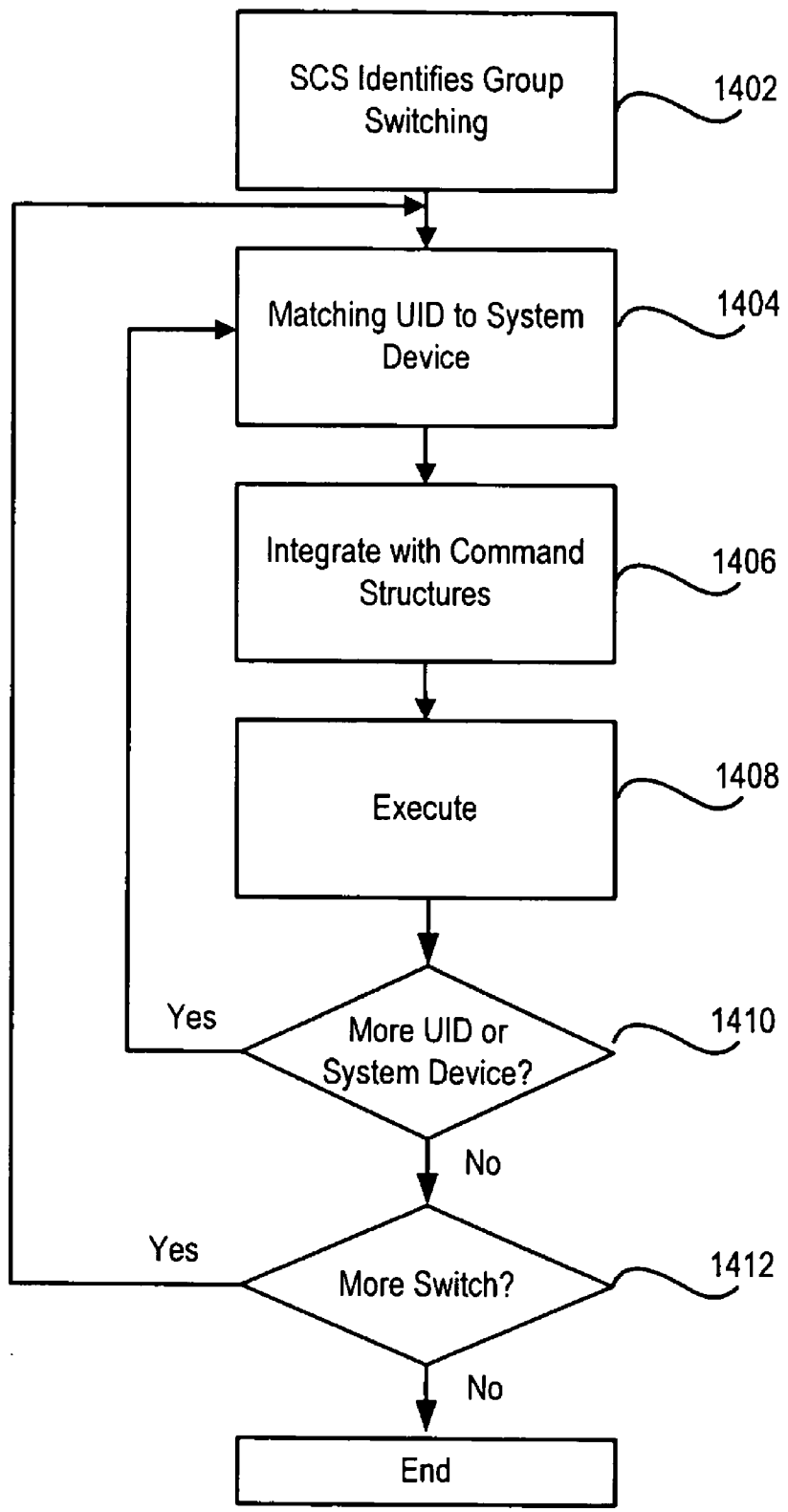
FIG. 14 shows, in an embodiment, a simplified flow chart representing the steps enabling group switching.

In an embodiment, the MNMOS may also provide for group switching. FIG. 14 shows, in an embodiment, a simplified flow chart representing the steps enabling group switching. FIG. 14 is discussed in relation to FIG. 8. Group switching may be employed to switch a plurality of system devices to a plurality of UIDs regardless of the hardware capability of the UID switches. An embodiment of the invention allows the human operator to dynamically arrange the order in which system devices are switched to UIDs, add and/or remove components of the group, and store multiple group profiles that can be utilized at any time.

When a switch command structure is assembled to execute operations on multiple components of switches, the procedure may be executed in a loop until the last command structure has been assembled and executed. Consider the situation wherein, for example, a user wants to connect from a three-users interface device group (e.g., UIDs 814a, 814b, and 814c) to a group of three servers, such as GOSD 822. Two UID switches (UID switches 804 and 808) are located on the data path between the two devices. At step 1402, the SCS may identify a group switching situation. At step 1404, a first UID (e.g., UID 814a) may be matched with a first system device (e.g., a system device in GOSD 822). The devices may be integrated with the command structure to form a first switch command (step 1406). The first switch command may be executed at step 1408. After the first switch command has been executed, the SCS may repeat steps 1404 through 1408 until each system device has been matched with a UID (step 1410). At step 1412, if additional switches are in the data path, the SCS may repeat steps 1404 through 1410 until all switches in the data path have been activated.

Built into the group switching logic is an error handler that manages mismatched UID and system device groups. In an example, if the number of UIDs exceeds the number of system devices, then the group switching logic may perform no action on the remaining UIDs or may connect one or more of the system devices to more than one UID. In another example, if the number of system devices exceeds the number of UIDs, then the group switching logic may perform no action at all or may perform "best effort" switching until all UIDs are exhausted.

Figure 15:
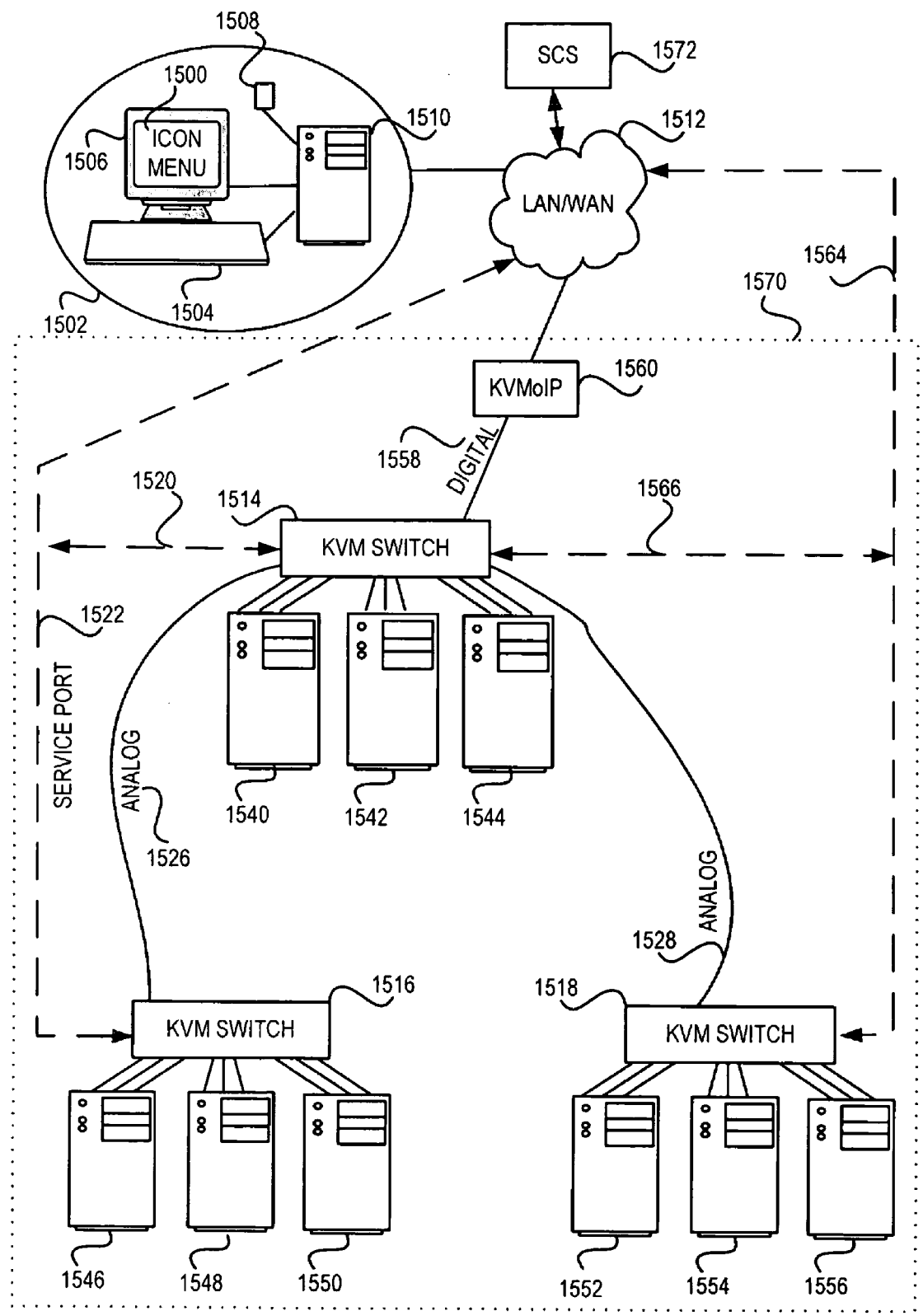
FIG. 15 shows, in an embodiment, a diagram illustrating remote desktop switching.

FIG. 15 shows, in an embodiment, a diagram illustrating remote desktop switching. A remote user 1502 with a keyboard 1504, a video monitor 1506, and a mouse 1508 are connected to a system device 1510. Remote user 1502 is connected to a network 1570 via a local/wide area network (LAN/WAN) connection 1512 and a SCS 1572. Network 1570 may include a plurality of UID switches (1514, 1516, and 1518). SCS 1572 is connected to UID switch 1514 either through a digital path 1558 or service ports (1520, 1522, 1564, and 1566). SCS 1572 is also connected to UID switch 1516 via service port 1522. Further, SCS 1572 is connected to UID switch 1518 via service port 1564. UID switches 1514 and 1516 are connected to one another via an analog path 1526. Also, connected to UID switch 1514 are a plurality of system devices (1540, 1542, and 1544) and UID switch 1518 via an analog path 1528. Analogously, a plurality of system devices (1546, 1548, and 1550) and (1552, 1554, and 1556) are connected to UID switch 1516 and 1518, respectively.

Consider the situation wherein, for example, remote user 1502 clicks on a desktop icon 1500 to request connectivity to system device 1550. The request for connectivity may first be sent through LAN/WAN connection 1512 to SCS 1572. In a remote situation, SCS 1572 may open a user browser, connect to and pass log-in data to an available IP access point while concurrently aligning data paths between the UID switches (1514 and 1516). To establish data path connectivity, SCS 1572 may first create a switch command to send to UID switch 1514 and KVMoIP appliance 1560 via digital path 1558. SCS 1572 may then send a second switch command to UID switch 1516 via service port 1522 to connect to system device 1550.

Figure 16:
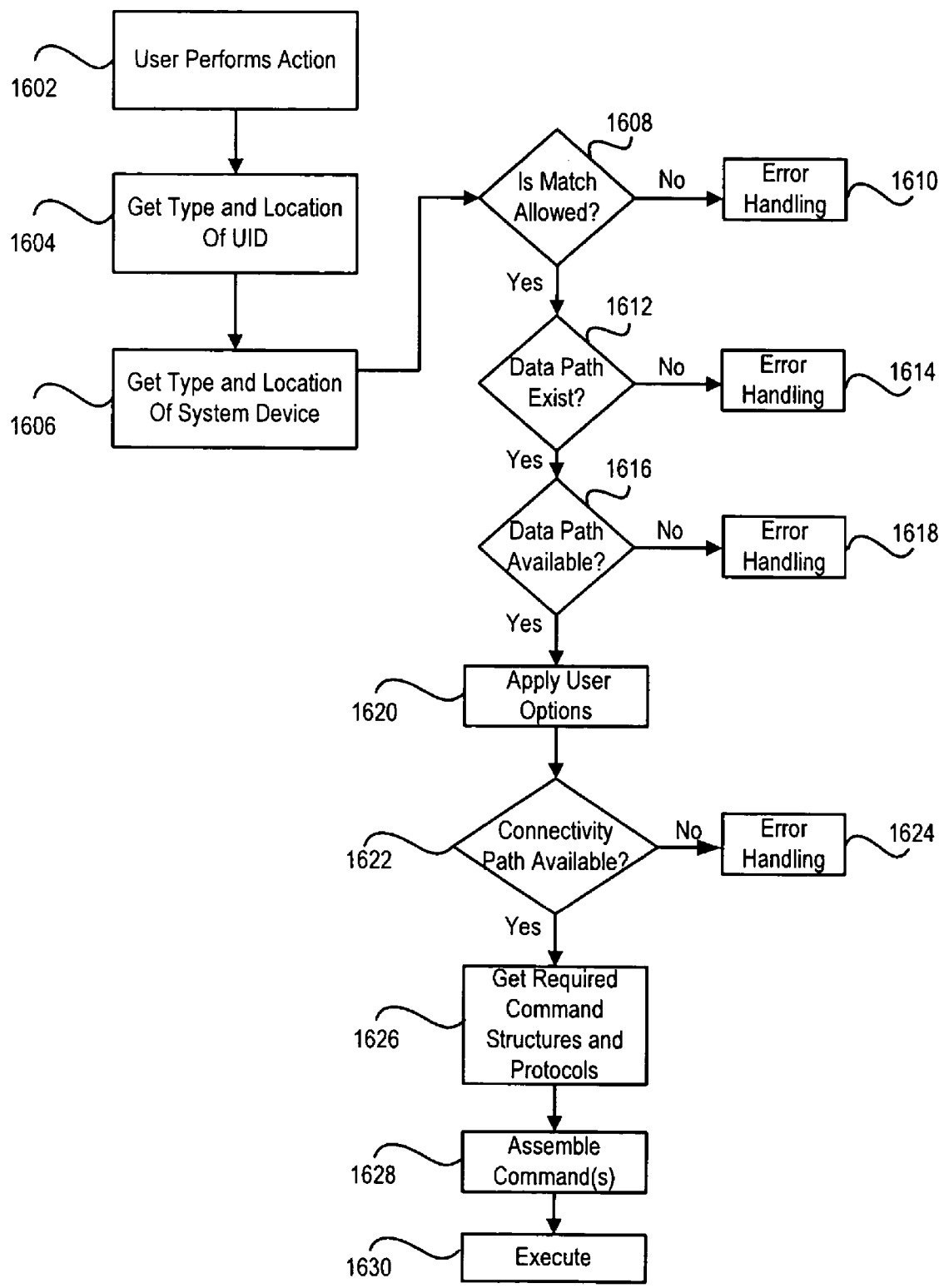
FIG. 16 shows, in an embodiment, a flowchart illustrating how a local, remote, or automated operator's request may be managed in a MNMOS arrangement.

FIG. 16 shows, in an embodiment, a flowchart illustrating how a local, remote, or automated operator's request may be managed in a MNMOS arrangement. Consider the situation wherein, for example, a user wants to connect his UID to a system device. At step 1602, the user may click on the system device. The signal that is sent to the SCS may contain information regarding the type and location of the user's UID and the selected system device (steps 1604 and 1606).

At step 1608, the SCS may determine the feasibility of a match. In an embodiment, the SCS may employ the authentication module to verify the user's access privilege to the system device. Further, while authentication is occurring, the SCS may apply additional logic to determine whether the UID and system device are able to communicate with one another. In an example, the SCS may determine that a user on an analog backbone may be unable to access remote servers. If match is not allowed, then error handling may occur at step 1610. Error handling may include, but are not limited to recording the action on a log and notifying the user.

However, if match is allowed, then at step 1612, the SCS may determine whether a data path exists. If no data path exists then error handling may occur at step 1614. Error handling may include, but are not limited to recording the action on a log and notifying the user. However, if the data path exists, then the SCS, at step 1616, may determine data path availability. If the data path is currently unavailable, then error handling may occur (step 1618). Error handling may include checking for data path availability at pre-determined intervals. However, if the data path is available then the SCS may proceed to step 1620 to check for any existing user option. User option may include preset options or manual user inputs.

At step 1622, the SCS may determine data path connectivity. Again, if the data path is unavailable then error handling may occur (step 1624). Assuming data path connectivity, the SCS may gather the command structures and protocols stored in the protocol modules (step 1626). Then, the SCS may assemble the command structures (step 1628) and may sequentially execute the switch commands (step 1630).

As can be appreciated from embodiments of the invention, desktop switching has reduced the laborious task of using keyboard commands and/or scrolling through OSD(s) to a SLACI. Further, desktop switching incorporated into a MNMOS seemingly transforms a large complex heterogeneous switch environment into a simplified homogeneous environment. Thus, a human operator, with a SLACI, can now globally manage and maintain various system devices on heterogeneous switches with a common user interface.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for creating a complete data path between a user interface device (UID) and a second system device, said UID being coupled to a first system device via a first UID switch prior to said creating said complete data path, said UID and said first system device being coupled to said first UID switch, wherein said second system device is coupled to one of said first UID switch and a second UID switch, wherein said second UID switch is a switch other than said first UID switch, wherein said second system device being one of a plurality of system devices on a network, wherein said network includes a set of interconnected UID switches and said set of interconnected UID switches including said first UID switch and said second UID switch, comprising:

receiving from said first system device a connect request, said connect request representing a request to form said complete data path between said UID and said second system device;

formulating a switch command via a switch command server (SCS), said SCS being in electronic communication with said set of interconnected UID switches, said SCS being configured at least for managing connect requests, performing dynamic network discovery, and performing protocol negotiation to establish said complete data path without human intervention, wherein said complete data path includes at least one of said set of interconnected UID switches, wherein said dynamic network discovery includes dynamic discovery of at least existence and availability of said set of interconnected UID switches and wherein said protocol negotiation includes protocol negotiation among said set of interconnected UID switches to facilitate communication among said UID switches; and transmitting said switch command from an input/output controller associated with said first system device to one of said first UID switch and said second UID switch, thereby establishing said complete data path between said UID and said second system device upon executing said switch command.

2. The method of claim 1 wherein said switch command is transmitted from said first system device to at least one of said first UID switch and said second UID switch via a keyboard controller associated with said first system device.

3. The method of claim 2 wherein said switch command is transmitted to at least one of said first UID switch and said second UID switch without traversing a keyboard associated with said UID.

4. The method of claim 2 wherein said switch command is transmitted to a keyboard associated with said UID prior to being forwarded to one of said first UID switch and said second UID switch.

5. The method of claim 1 wherein said switch command is transmitted from said first system device to at least one of said first UID switch and said second UID switch via a video controller associated with said first system device.

6. The method of claim 5 wherein said switch command is transmitted to at least one of said first UID switch and said second UID switch without traversing a monitor associated with said UID.

7. The method of claim 5 wherein said switch command is transmitted to a monitor associated with said UID prior to being forwarded to one of said first UID switch and said second UID switch.

8. The method of claim 1 wherein said first system device is a computer.

9. The method of claim 1 wherein said UID includes a keyboard and a monitor.

10. The method of claim 9 wherein said UID includes a mouse.

11. The method of claim 9 wherein said UID includes a trackball.

12. The method of claim 1 wherein said connect request is generated responsive to a switch/location agnostic connectivity indication (SLACI) not associated with said UID, said SLACI causing said first UID switch to select its connection from said first system device to said second system device.

13. The method of claim 1 wherein said connect request is generated responsive to a switch/location agnostic connectivity indication (SLACI) on an item of a populated list displayed on a monitor associated with said UID, said item representing said second system device.

14. The method of claim 1 wherein said switch command includes a bit pattern that can be identified by said first UID switch as information destined for use by said first UID switch to manage UID connectivity.

15. A method for creating a complete data path between a user interface device (UID) and a second system device, said UID being coupled to a first system device via a first UID switch prior to said creating said complete data path, said UID and said first system device being coupled to said first UID switch, wherein said second system device is coupled to one of said first UID switch and a second UID switch, wherein said second UID switch is a switch other than said first UID switch, wherein said second system device being one of a plurality of system devices on a network, wherein said network includes a set of interconnected UID switches and said set of interconnected UID switches including said first UID switch and said second UID switch, comprising:

receiving at said first system device a connect request from said second system device;

formulating, using said second system device and responsive to a receipt of said connect request, a switch command that is configured to cause one of said first UID switch and said second UID switch to create said complete data path when said switch command is executed, said switch command being formulated via a switch command server (SCS), said SCS being in electronic communication with said set of interconnected UID switches, said SCS being configured at least for managing connect requests, performing dynamic network discovery, and performing protocol negotiation to establish said complete data path without human intervention, wherein said complete data path includes at least one of said set of interconnected UID switches, wherein said dynamic network discovery includes dynamic discovery of at least existence and availability of said set of interconnected UID switches and wherein said protocol negotiation includes protocol negotiation among said set of interconnected UID switches to facilitate communication among said UID switches;

transmitting said switch command from an input/output controller associated with said second system device to one of said first UID switch and said second UID switch; and executing said switch command using one of said first UID switch and said second UID switch, thereby forming said complete data path between said UID and said second system device.

16. The method of claim 15 wherein said switch command is transmitted via a keyboard controller associated with said second system device.

17. The method of claim 16 wherein said switch command is transmitted to one of said first UID switch and said second UID switch without traversing a keyboard.

18. The method of claim 15 wherein said switch command is transmitted via a video controller associated with said second system device.

19. The method of claim 18 wherein said switch command is transmitted to one of said first UID switch and said second UID switch without traversing a video monitor.

20. The method of claim 15 wherein said second system device is a computer.

21. The method of claim 15 wherein said switch command includes a bit pattern that can be identified by one of said first UID switch and said second UID switch as information destined for use by one of said first UID switch and said second UID switch to manage UID connectivity.

22. An article of manufacture comprising a program storage medium having computer readable code embodied therein, said computer readable code being configured for creating a complete data path between a user interface device (UID) and a second system device, said UID being coupled to a first system device via a first UID switch prior to said creating said complete data path, said UID and said first system device being coupled to said first UID switch, wherein said second system device is coupled to one of said first UID switch and a second UID switch, wherein said second UID switch is a switch other than said first UID switch, wherein said second system device being one of a plurality of system devices on a network, wherein said network includes a set of interconnected UID switches and said set of interconnected UID switches including said first UID switch and said second UID switch, comprising:

computer readable code for receiving from at said first system device a connect request, said connect request representing a request to form said complete data path between said UID and said second system device;

computer readable code for formulating a switch command via a switch command server (SCS), said SCS being in electronic communication with said set of interconnected UID switches, said SCS being configured at least for managing connect requests, performing dynamic network discovery, and performing protocol negotiation to establish said complete data path without human intervention, wherein said complete data path includes at least one of said set of interconnected UID switches, wherein said dynamic network discovery includes dynamic discovery of at least existence and availability of said set of interconnected UID switches and wherein said protocol negotiation includes protocol negotiation among said set of interconnected UID switches to facilitate communication among said UID switches; and computer readable code for transmitting said switch command from an input/output controller associated with said first system device to one of said first UID switch and said second UID switch, thereby establishing said complete data path to said second system device upon executing said switch command.

23. The article of manufacture of claim 22 wherein said computer readable code for transmitting said switch command from said first system device to at least one of said first UID switch and said second UID switch includes computer readable code for transmitting said switch command via a keyboard controller associated with said first system device.

24. The article of manufacture of claim 22 wherein said computer readable code for transmitting said switch command from said first system device to one of said first UID switch and said second UID switch includes computer readable code for transmitting said switch command via a video controller associated with said first system device.

25. The article of manufacture of claim 22 wherein said first system device is a server.

26. The article of manufacture of claim 22 wherein said switch command includes a bit pattern that can be identified by one of said first UID switch and said second UID switch as information destined for use by one of said first UID switch and said second UID switch to manage UID connectivity.

* * * * *